(12) United States Patent
Shinoda et al.

(10) Patent No.: US 9,957,169 B2
(45) Date of Patent: May 1, 2018

(54) SEAWATER DESALINATION SYSTEM AND ENERGY RECOVERY APPARATUS

(71) Applicant: EBARA CORPORATION, Tokyo (JP)

(72) Inventors: Masao Shinoda, Tokyo (JP); Shigeo Takita, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 187 days.

(21) Appl. No.: 14/774,011

(22) PCT Filed: Feb. 25, 2014

(86) PCT No.: PCT/JP2014/054493
§ 371 (c)(1),
(2) Date: Sep. 9, 2015

(87) PCT Pub. No.: WO2014/141872
PCT Pub. Date: Sep. 18, 2014

(65) Prior Publication Data
US 2016/0016826 A1 Jan. 21, 2016

(30) Foreign Application Priority Data

Mar. 11, 2013 (JP) .................................. 2013-048371

(51) Int. Cl.
*C02F 1/44* (2006.01)
*B01D 61/12* (2006.01)
(Continued)

(52) U.S. Cl.
CPC ............ *C02F 1/441* (2013.01); *B01D 61/025* (2013.01); *B01D 61/06* (2013.01); *B01D 61/12* (2013.01);
(Continued)

(58) Field of Classification Search
None
See application file for complete search history.

(56) References Cited

U.S. PATENT DOCUMENTS

2012/0061309 A1* 3/2012 Takahashi ............ B01D 61/025
210/251

FOREIGN PATENT DOCUMENTS

| JP | 8-294619 A | 11/1996 |
|---|---|---|
| JP | 2003-144856 A | 5/2003 |

(Continued)

OTHER PUBLICATIONS

International Search Report for Application No. PCT/JP2014/054493 dated Apr. 22, 2014.

*Primary Examiner* — Krishnan S Menon
(74) *Attorney, Agent, or Firm* — Pearne & Gordon LLP

(57) ABSTRACT

An energy recovery apparatus usable in a seawater desalination system. The energy recovery apparatus includes a plurality of chambers to pressurize the seawater by pressure energy of the concentrated seawater by supply and discharging the concentrated seawater and the seawater, a first flowmeter for integrating a flow rate of the seawater or the concentrated seawater which flows into the chamber, a second flowmeter for integrating a flow rate of the seawater or the concentrated seawater discharged from the chamber, a switching valve in each of the chambers to switch the inflow and the discharge of the concentrated seawater, and a controller to control the respective switching valves of the chambers on the basis of integrated flow rate of the chamber obtained from the flow rate of the flowmeter. The controller inputs a single input signal to the respective switching valves of the chambers to control the respective switching valves.

10 Claims, 13 Drawing Sheets

(51) Int. Cl.
    *B01D 61/02*        (2006.01)
    *B01D 61/06*        (2006.01)
    *C02F 103/08*       (2006.01)
    *C02F 1/00*         (2006.01)
(52) U.S. Cl.
    CPC .......... *C02F 1/008* (2013.01); *B01D 2313/18* (2013.01); *C02F 2103/08* (2013.01); *C02F 2209/005* (2013.01); *C02F 2209/40* (2013.01); *C02F 2303/10* (2013.01); *Y02A 20/131* (2018.01); *Y02W 10/30* (2015.05)

(56) References Cited

FOREIGN PATENT DOCUMENTS

| | | |
|---|---|---|
| JP | 2010-284642 A | 12/2010 |
| JP | 2012-192324 A | 10/2012 |
| JP | 2013-139012 A | 7/2013 |

\* cited by examiner

SEAWATER DESALINATION SYSTEM AND ENERGY RECOVERY APPARATUS

TECHNICAL FIELD

The present invention relates to a seawater desalination system for desalinating seawater by removing salinity from the seawater and an energy recovery apparatus which is preferably used in the seawater desalination system.

BACKGROUND ART

Conventionally, as a system for desalinating seawater, there has been known a seawater desalination plant in which seawater passes through a reverse-osmosis membrane-separation apparatus to remove salinity from the seawater. In the seawater desalination system, the intake seawater is processed to have certain water qualities by a pretreatment system, and the pretreated seawater is delivered into the reverse-osmosis membrane-separation apparatus under pressure by a high-pressure pump. Part of the high-pressure seawater in the reverse-osmosis membrane-separation apparatus passes through a reverse-osmosis membrane against the osmotic pressure and is desalinated, and fresh water (permeate or desalted water) is taken out from the reverse-osmosis membrane-separation apparatus. The remaining seawater is discharged in a concentrated state of a high salt content as a concentrated seawater (brine) from the reverse-osmosis membrane-separation apparatus. The largest operational cost in the seawater desalination system is energy cost, and it depends heavily on energy for pressurizing the pretreated seawater up to such a pressure to overcome the osmotic pressure, i.e. up to the reverse-osmosis pressure. That is, the operational cost of the seawater desalination system is greatly affected by pressurizing energy of the seawater by the high-pressure pump.

Specifically, more than half of the electric power expenses as the highest cost in the seawater desalination system are consumed to operate the high-pressure pump for pressurizing the seawater. Then, pressure energy possessed by the high-pressure concentrated seawater with the high salt content which has been discharged from the reverse-osmosis membrane-separation apparatus is utilized for pressurizing part of the seawater. Therefore, as a means for utilizing the pressure energy of the concentrated seawater discharged from the reverse-osmosis membrane-separation apparatus to pressurize part of the seawater, there has been utilized an energy recovery chamber in which an interior of a cylinder is separated into two spaces by a piston arranged to be movable in the cylinder, a concentrated seawater port is provided in one of the two separated spaces to introduce and discharge the concentrated seawater, and a seawater port is provided in the other of the two separated spaces to introduce and discharge the seawater.

FIG. 13 is a schematic view showing a configuration example of a conventional seawater desalination system. As shown in FIG. 13, seawater pumped into the seawater desalination system by an intake pump (not shown) is processed to have certain water qualities by a pretreatment system 1 for removing suspended matter or the like, and then the pretreated seawater is branched via a feed pump 2 into a high-pressure pump line 3 and an energy-recovery-apparatus seawater supply line 4. The seawater which has flowed into a high-pressure pump 5 is pressurized by the high-pressure pump 5 and merges into the seawater pressurized by an energy recovery device 10 and a booster pump 7, and is then delivered under pressure to a reverse-osmosis membrane-separation apparatus 8.

Part of the seawater introduced into the reverse-osmosis membrane-separation apparatus 8 passes through a reverse-osmosis membrane (RO membrane) 8a of the reverse-osmosis membrane-separation apparatus 8 against the osmotic pressure and is desalinated, and desalted water is taken out through a desalted water line. The remaining seawater becomes a concentrated seawater with a high salt content, and the concentrated seawater is introduced into the energy recovery device 10 from the reverse-osmosis membrane-separation apparatus 8 through a concentrated seawater line 9.

In the energy recovery device 10, with the operation of a control valve 14, pistons 13, 13 are moved in the energy recovery chambers 11, 12 to introduce the seawater from the feed pump 2 through a check valve module 15 and to pressurize and discharge the seawater by utilizing the high-pressure concentrated seawater (reject).

The seawater pressurized in the energy recovery chambers 11, 12 is supplied to the booster pump 7 from the check valve module 15 through a booster-pump seawater supply line 6. With the booster pump 7, the seawater is pressurized by an amount corresponding to a pressure loss in the reverse-osmosis membrane-separation apparatus 8 and pipes, a pressure loss in the control valve 14, and a pressure loss generated in the energy recovery chambers 11, 12 and the check valve module 15, and the pressurized seawater merges into the seawater discharged from the high-pressure pump 5 and is then delivered under pressure to the reverse-osmosis membrane-separation apparatus 8.

In the above-described conventional energy recovery chamber, the piston in the energy recovery chamber is brought into sliding contact with the inner wall of the cylinder, and thus the sliding member of the piston is required to be periodically replaced due to wear of the sliding member. Further, the inner diameter of the long chamber is required to be machined with high accuracy so as to fit with the outer shape of the piston, and thus machining cost is very expensive.

Therefore, the applicants of the present invention have proposed an energy recovery chamber having no piston in which a cylindrical and elongated chamber is used as a pressure exchange chamber and a plurality of partitioned fluid passages are provided in the chamber to directly pressurize the seawater with the high-pressure concentrated seawater which is discharged from the reverse-osmosis membrane (RO membrane) in Japanese laid-open patent publication No. 2010-284642.

CITATION LIST

Patent Literature

Patent document 1: Japanese laid-open patent publication No. 2010-284642

SUMMARY OF INVENTION

Technical Problem

In the conventional energy recovery chamber having a piston, a magnet is incorporated in the piston, and magnet switches for detecting magnetism are provided outside of the chamber to detect the position of the piston. Because the piston moves in the chamber while separating the concentrated seawater and the seawater, the magnet switches are provided in the vicinity of both ends of the chamber to switch the moving direction of the piston by a control valve or the like and to reciprocate the piston in the chamber, thereby controlling switching of supply and discharge of the seawater and the concentrated seawater. The position of the piston is detected also by a proximity sensor, a laser sensor, a photoelectric sensor, etc.

On the other hand, in the energy recovery chamber having no piston, since there is no piston, the supply and discharge amount of the seawater and the concentrated seawater cannot be controlled in the same manner. Therefore, it is necessary to control switching of the supply and discharge of the seawater and the concentrated seawater by different means or different methods.

The present invention has been made in view of the above circumstances. It is therefore an object of the present invention to provide an energy recovery apparatus which can perform switching between supply of the concentrated seawater or the seawater to an energy recovery chamber and discharge of the concentrated seawater or the seawater from the energy recovery chamber at an exact timing both in the energy recovery chamber having no piston and in the energy recovery chamber having a piston.

Solution to Problem

In order to achieve the above object, according to one aspect of the present invention, there is provided an energy recovery apparatus for exchanging pressure energy between concentrated seawater discharged from a reverse-osmosis membrane-separation apparatus and a part of seawater to be treated by the reverse-osmosis membrane-separation apparatus in a seawater desalination system for producing fresh water from the seawater by supplying the seawater to the reverse-osmosis membrane-separation apparatus to separate the seawater into fresh water and concentrated seawater, the energy recovery apparatus comprising: a plurality of chambers configured to pressurize the seawater by pressure energy of the concentrated seawater by supply and discharging the concentrated seawater and the seawater; a first flowmeter used for integrating a flow rate of the seawater or the concentrated seawater which flows into the chamber; a second flowmeter used for integrating a flow rate of the seawater or the concentrated seawater discharged from the chamber; at least one switching valve provided in each of the plurality of chambers and configured to switch the inflow of the concentrated seawater to the chamber and the discharge of the concentrated seawater from the chamber; and a controller configured to control the respective switching valves of the plurality of chambers on the basis of integrated flow rate of the chamber, the integrated flow rate of the chamber being obtained on the basis of the flow rate of the first flowmeter and/or the second flowmeter; wherein the controller inputs a single input signal to the respective switching valves of the plurality of chambers to control the respective switching valves.

According to the present invention, by supplying and discharging the concentrated seawater discharged from the reverse-osmosis membrane-separation apparatus to the plural chambers through the switching valves and by supplying and discharging the seawater to the plural chambers, the seawater can be pressurized by the concentrated seawater in the respective chambers and the pressurized seawater can be discharged. The flow rate of the seawater or the concentrated seawater which flows into the chamber is measured by the first flowmeter to obtain an integrated flow rate, or the flow rate of the seawater or the concentrated seawater discharged from the chamber is measured by the second flowmeter to obtain an integrated flow rate, and the inflow amount of the seawater or the concentrated seawater to the chamber and/or the discharge amount of the seawater or the concentrated seawater from the chamber is grasped on the basis of the obtained integrated flow rate to control the valve opening of the switching valve. Thus, switching of supply and discharge of the concentrated seawater and the seawater to the chamber can be performed at an exact timing. Further, since the valve openings of the respective switching valves installed in the plural chambers can be adjusted by a single input signal, a number of switching valves can be controlled easily and reliably.

According to a preferred aspect of the present invention, valve opening and switching time of each of the switching valves can be controlled by the single input signal.

According to the present invention, since valve opening and switching time of each of the switching valves can be controlled by the single input signal, a number of switching valves can be controlled more appropriately.

According to a preferred aspect of the present invention, a trapezoidal wave is used for the single input signal.

According to the present invention, by providing time when the inputted signal value is constant, the time when the valve openings of the respective switching valves are maintained constant can be adjusted.

According to a preferred aspect of present invention, the valve opening of each of the respective switching valves is set so as to vary in response to the input signal based on a predetermined setting value.

According to the present invention, since the switching valves are controlled on the basis of setting values representing specific relationship between the inputted signal value and the valve openings of the respective switching valves, the respective switching valves can be controlled while the valve openings of the respective switching valves are corrected by altering the setting values.

According to a preferred aspect of the present invention, the controller controls the switching valve so as to perform switching of the switching valve of the chamber when an integrated flow rate of the chamber by the first flowmeter or the second flowmeter reaches a predetermined value.

According to the present invention, when the integrated flow rate reaches a predetermined value after starting the integration by the first flowmeter or the second flowmeter, the switching of the switching valve is performed. Therefore, the inflow of the concentrated seawater can be stopped at the timing when the inflow amount of the concentrated seawater to the chamber reaches a predetermined value. Thus, the concentrated seawater does not flow into the booster pump from the energy recovery apparatus. In this case, the inflow amount of the concentrated seawater to the chamber can be obtained from the integrated flow rate measured by the first flowmeter. Further, since the seawater in the chamber is discharged by the inflow of the concentrated seawater to the chamber, by obtaining the discharge amount of the seawater discharged from the chamber from the integrated flow rate of the seawater measured by the second flowmeter, the inflow amount of the concentrated seawater to the chamber can be obtained.

According to a preferred aspect of the present invention, switching of the switching valve is performed by a value calculated from a predetermined ratio of the actual volume of the chamber.

According to the present invention, when the inflow amount of the concentrated seawater to the chamber reaches the predetermined ratio (e.g., 80-90%) of the actual volume of the chamber, the inflow of the concentrated seawater can be stopped. Therefore, the concentrated seawater does not flow into the booster pump from the energy recovery apparatus. As described above, the inflow amount of the concentrated seawater to the chamber may be obtained from the integrated flow rate of the first flowmeter or the integrated flow rate of the second flowmeter.

According to a preferred aspect of the present invention, the controller controls the flow rate of the concentrated seawater discharged from the chamber by comparing an integrated value of an inflow amount of the concentrated seawater to the chamber and an integrated value of a discharge amount of the concentrated seawater from the chamber.

According to the present invention, the integrated value of the inflow amount of the concentrated seawater to the chamber is compared with the integrated value of the discharge amount of the concentrated seawater from the chamber, and the flow rate of the concentrated seawater discharged from the chamber is controlled. Because the discharge amount of the concentrated seawater discharged from the chamber is equal to the inflow amount of the seawater flowing into the chamber, the inflow amount of the seawater to the chamber can be obtained by obtaining the discharge amount of the concentrated seawater from the chamber. Therefore, by comparing the integrated value of the inflow amount of the concentrated seawater to the chamber and the integrated value of the discharge amount of the concentrated seawater from the chamber, a balance between the inflow amount of the concentrated seawater to the chamber and the inflow amount of the seawater to the chamber can be achieved. By achieving this balance appropriately, the concentrated seawater does not flow into the booster pump from the energy recovery apparatus.

Further, from the above:
Comparison between the integrated value of the inflow amount of the seawater to the chamber and the integrated value of the discharge amount of the seawater discharged from the chamber
Comparison between the integrated value of the inflow amount of the concentrated seawater to the chamber and the integrated value of the discharge amount of the seawater discharged from the chamber
Comparison between the integrated value of the inflow amount of the seawater to the chamber and the integrated value of the discharge amount of the concentrated seawater discharged from the chamber It goes without saying that the above balance can be achieved by the above comparisons. In short, by comparing the integrated value of the fluid flowing into the chamber and the integrated value of the fluid discharged from the chamber, the inflow of the concentrated seawater to the booster pump can be avoided.

Here, the case where the integrated value of the inflow amount of the concentrated seawater to the chamber is compared with the integrated value of the discharge amount of the concentrated seawater from the chamber will be described.

According to the present invention, by control of the switching valve, the inflow amount of the seawater to the chamber and the inflow amount of the concentrated seawater to the chamber can be adjusted freely.

According to a preferred aspect of the present invention, the controller controls the switching valve so that an integrated value of the inflow amount of the seawater to the chamber is equal to or larger than an integrated value of the inflow amount of the concentrated seawater to the chamber.

According to the present invention, because the switching valve is controlled so that the integrated value of the inflow amount of the seawater to the chamber is equal to or larger than the integrated value of the inflow amount of the concentrated seawater to the chamber, the concentrated seawater does not flow into the booster pump from the energy recovery apparatus.

According to a preferred aspect of the present invention, the controller controls the respective switching valves so as to include a process for discharging the pressurized seawater from the plurality of chambers simultaneously.

In the plural chambers, a process for introducing the seawater and a process for pressurizing the intake seawater by the concentrated seawater and discharging the pressurized seawater are repeated. In this case, if the switching valves are controlled so that when one chamber finishes the seawater discharge process, another chamber starts the seawater discharge process, pulsation of the pressurized seawater occurs at the time of switching. Therefore, according to the present invention, by controlling the switching valves so that the pressurized seawater is discharged simultaneously from the plural chambers, i.e., by overlapping the seawater discharge processes of the plural chambers, pulsation of the pressurized seawater can be suppressed.

According to a second aspect of the present invention, there is provided an energy recovery apparatus for exchanging pressure energy between concentrated seawater discharged from a reverse-osmosis membrane-separation apparatus and a part of seawater to be treated by the reverse-osmosis membrane-separation apparatus in a seawater desalination system for producing fresh water from the seawater by supplying the seawater to the reverse-osmosis membrane-separation apparatus to separate the seawater into fresh water and concentrated seawater, the energy recovery apparatus comprising: a plurality of chambers configured to pressurize the seawater by pressure energy of the concentrated seawater by supply and discharging the concentrated seawater and the seawater; at least one switching valve provided in each of the plurality of chambers and configured to switch the inflow of the concentrated seawater to the chamber and the discharge of the concentrated seawater from the chamber; and a controller configured to input a single input signal to the respective switching valves of the plurality of chambers to control the respective switching valves.

According to the present invention, by supplying and discharging the concentrated seawater discharged from the reverse-osmosis membrane-separation apparatus to the plural chambers through the switching valves and by supplying and discharging the seawater to the plural chambers, the seawater can be pressurized by the concentrated seawater in the respective chambers and the pressurized seawater can be discharged. Further, since the valve openings of the respective switching valves installed in the plural chambers can be adjusted by a single input signal, a number of switching valves can be controlled easily and reliably.

According to a third aspect of the present invention, there is provided a seawater desalination system for producing fresh water from seawater by supplying the seawater to a reverse-osmosis membrane-separation apparatus to separate the seawater into fresh water and concentrated seawater, the seawater desalination system comprising: an energy recovery apparatus according to any one of claims 1 to 10 for exchanging pressure energy between the concentrated seawater discharged from the reverse-osmosis membrane-separation apparatus and a part of the seawater to be treated by the reverse-osmosis membrane-separation apparatus.

Advantageous Effects of Invention

According to the present invention, the following effects can be achieved.

1) Since switching of supply and discharge of the concentrated seawater and seawater to the plural chambers can be performed at an exact timing, the seawater with a high salt content is not delivered to the reverse-osmosis membrane-separation apparatus, and thus the reverse-osmosis membrane-separation apparatus can provide sufficient performance without lowering the desalting rate and the replacement cycle of the reverse-osmosis membrane itself can be prolonged.

2) Since the plural switching valves can be operated in interlocking with each other by inputting a single input signal, the work to determine the opening and closing sequence of the plural switching valves can be saved, thus saving time. Further, when the opening and closing sequence of a number of switching valves is determined, the opening and closing sequence is not determined in error, thus avoiding functional deterioration of the apparatus.

3) Since a process for discharging the pressurized seawater from the plural chambers simultaneously is included, pulsation of flow rate and pressure of the pressurized seawater can be small.

4) Since the inflow amount of the seawater flowing into the chamber can be controlled by controlling the discharge amount of the concentrated seawater discharged from the chamber, the seawater is not discharged from the chamber more than necessary.

5) When the demand for fresh water in the seawater desalination system is changed, the flow rate of the concentrated seawater supplied from the reverse-osmosis membrane-separation apparatus to the energy recovery apparatus is changed. However, the present invention can follow this flow rate change rapidly.

DESCRIPTION OF EMBODIMENTS

Figure 1:
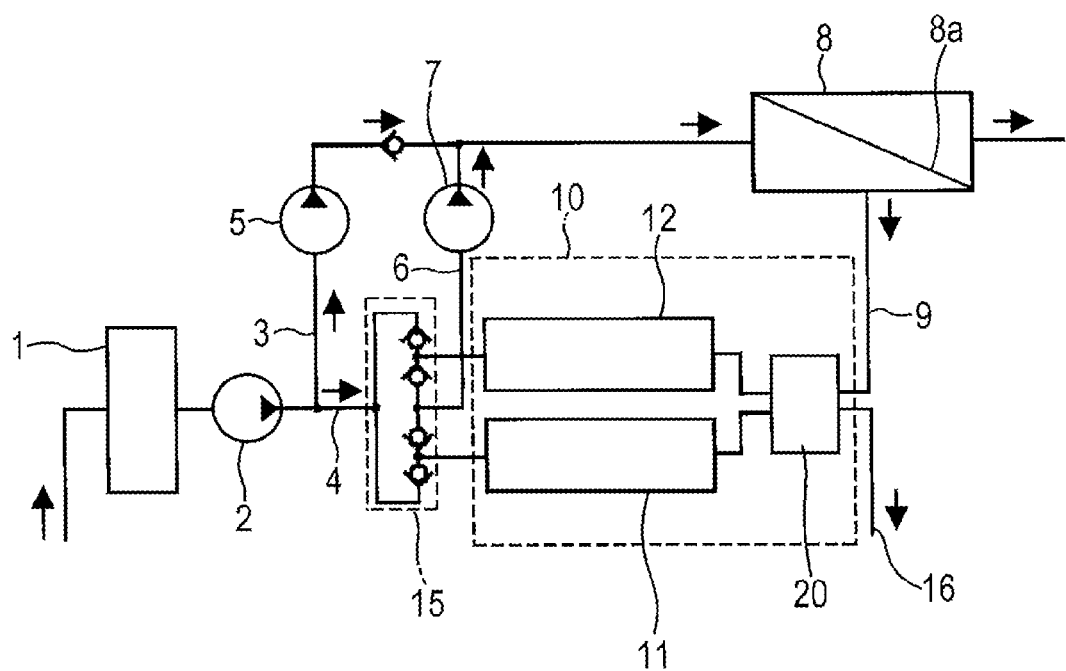
FIG. 1 is a schematic view showing a configuration example of a seawater desalination system according to the present invention.

A seawater desalination system according to preferred embodiments of the present invention will be described in detail below with reference to FIG. 1 through 12. Identical or corresponding parts are denoted by identical reference numerals in FIGS. 1 through 12 and will not be described in duplication.

FIG. 1 is a schematic view showing a configuration example of a seawater desalination system according to the present invention. As shown in FIG. 1, seawater pumped into the seawater desalination system by an intake pump (not shown) is processed to have certain water qualities by a pretreatment system 1, and then the pretreated seawater is branched via a feed pump 2 into a high-pressure pump line 3 and an energy-recovery-apparatus seawater supply line 4. The seawater which has flowed into a high-pressure pump 5 is pressurized by the high-pressure pump 5 and merges into the seawater pressurized by an energy recovery device 10 and a booster pump 7, and is then delivered under pressure to a reverse-osmosis membrane-separation apparatus 8.

Part of the seawater introduced into the reverse-osmosis membrane-separation apparatus 8 passes through a reverse-osmosis membrane (RO membrane) 8a in the reverse-osmosis membrane-separation apparatus 8 against the osmotic pressure and is desalinated, and desalted water is taken out through a desalted water line. The remaining seawater becomes a concentrated seawater with a high salt content, and the concentrated seawater is introduced into the energy recovery device 10 from the reverse-osmosis membrane-separation apparatus 8 through a concentrated seawater line 9.

In the energy recovery device 10, with the operation of a switching device 20, an interface between the concentrated seawater and the seawater moves in each of two energy recovery chambers 11, 12 by a pressure balance between the concentrated seawater and the seawater to introduce the seawater from the feed pump 2 through a check valve module 15 and to pressurize and discharge the seawater by utilizing the high-pressure concentrated seawater (reject).

The seawater pressurized in the energy recovery chambers 11, 12 is supplied to the booster pump 7 from the check valve module 15 through a booster-pump seawater supply line 6. With the booster pump 7, the seawater is pressurized by an amount corresponding to a pressure loss in the reverse-osmosis membrane-separation apparatus 8 and pipes, a pressure loss in the switching device 20, and a pressure loss generated in the energy recovery chambers 11, 12 and the check valve module 15, and the pressurized seawater merges into the seawater discharged from the high-pressure pump 5 and is then delivered under pressure to the reverse-osmosis membrane-separation apparatus 8.

Figure 2:
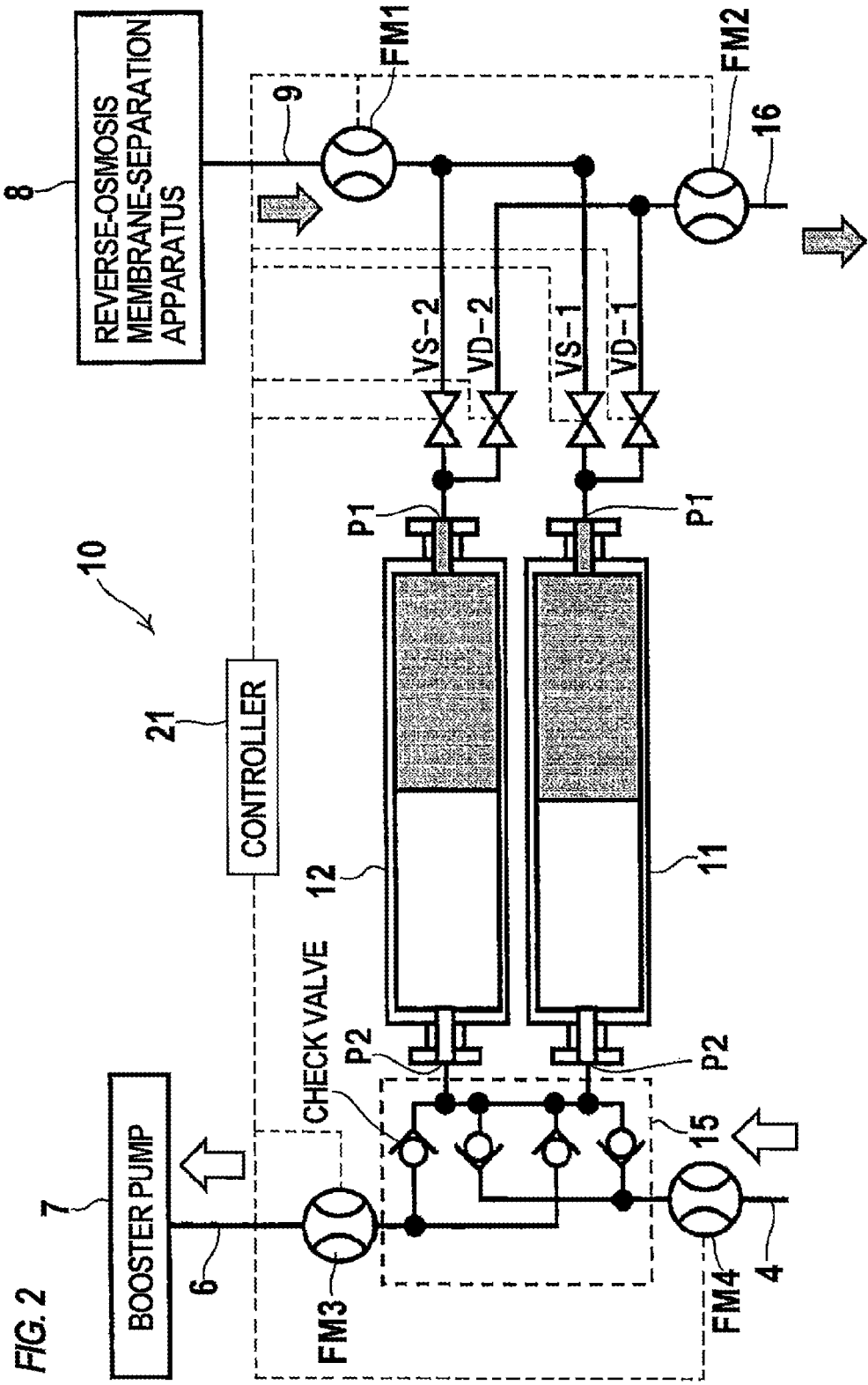
FIG. 2 is a schematic view showing a configuration example of the energy recovery apparatus according to the present invention.

Next, in the energy recovery apparatus having the plural energy recovery chambers in which the interface between the concentrated seawater and the seawater moves in the chamber by a pressure balance between the concentrated seawater and the seawater as shown in FIG. 1, a configuration for controlling the supply of the concentrated seawater or the seawater to the plural energy recovery chambers and the discharge of the concentrated seawater or the seawater from the plural energy recovery chambers will be described with reference to FIG. 2. In FIG. 2, an example where two energy recovery chambers are provided is illustrated. However, three or more energy recovery chambers may be provided.

FIG. 2 is a schematic view showing a configuration example of the energy recovery device 10 according to the present invention. As shown in FIG. 2, the energy recovery device 10 comprises two energy recovery chambers 11, 12. The concentrated seawater line 9 for discharging the concentrated seawater from the reverse-osmosis membrane-separation apparatus 8 is branched into two lines, one of which is connected via a switching valve VS-1 to a concentrated seawater port P1 of the energy recovery chamber 11, and the other of which is connected via a switching valve VS-2 to a concentrated seawater port P1 of the energy recovery chamber 12. Further, the concentrated seawater port P1 of the energy recovery chamber 11 is connected via a switching valve VD-1 to a concentrated seawater discharge line 16, and the concentrated seawater port P1 of the energy recovery chamber 12 is connected via a switching valve VD-2 to the concentrated seawater discharge line 16. A flowmeter FM1 is provided at an upstream side of the switching valves VS-1, VS-2 in the concentrated seawater line 9. A flowmeter FM2 is provided at a downstream side of the switching valves VD-1, VD-2 in the concentrated seawater discharge line 16. The switching valves VS-1, VS-2, VD-1 and VD-2 constitute the switching device 20 (see FIG. 1). The respective switching valves VS-1, VS-2, VD-1 and VD-2 are connected to a controller 21, and the operation of the respective switching valves VS-1, VS-2, VD-1 and VD-2 is controlled by the controller 21. In FIG. 2, a configuration example where the switching valves VS-1, VS-2, VD-1 and VD-2 comprise an on-off valve will be described. However, the switching valve may comprise any valve such as a 3-way valve, a 4-way valve, or a rotary valve as long as the switching valve has a switching function of fluid flow.

On the other hand, the seawater port P2 of the energy recovery chamber 11 is connected via the check valve module 15 comprising four check valves to the booster-pump seawater supply line 6 and the energy-recovery-apparatus seawater supply line 4. Further, the seawater port P2 of the energy recovery chamber 12 is connected via the check valve module 15 comprising four check valves to the booster-pump seawater supply line 6 and the energy-recovery-apparatus seawater supply line 4. A flowmeter FM3 is provided in the booster-pump seawater supply line 6. Further, a flowmeter FM4 is provided in the energy-recovery-apparatus seawater supply line 4. The respective flowmeters FM1, FM2, FM3 and FM4 are connected to the controller 21, and the integration or the like of measured values in the respective flowmeters FM1, FM2, FM3 and FM4 is performed by the controller 21.

One aspect of a method for controlling supply and discharge of the concentrated seawater and the seawater to the energy recovery chamber in the energy recovery apparatus according to the present invention will be described. The control method used in the present invention is an operation control method of the switching valves which can control valve openings of the plural switching valves and switching time of the switching valves by a single input signal.

Figure 3:
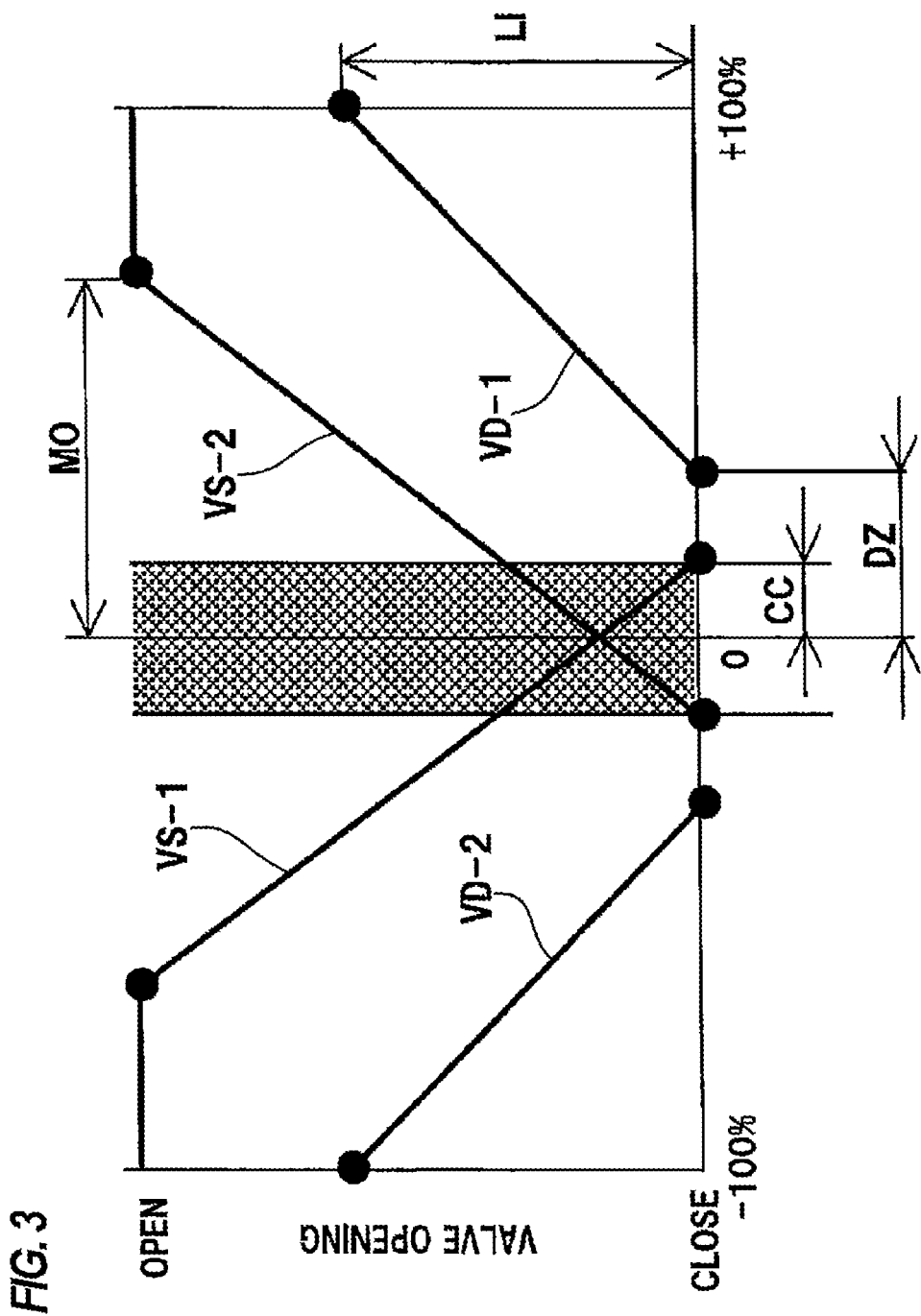
FIG. 3 is a graph showing the relationship between the valve openings of the switching valves (vertical axis) and an input signal (horizontal axis)

The relationship between the valve openings of the switching valves (vertical axis) and an input signal (horizontal axis) is shown in FIG. 3. As shown in FIG. 3, the input signal to the switching valves (VS-1, VS-2, VD-1 and VD-2) takes the value from −100(%) to +100(%), and the valve openings of the switching valves shown in the vertical axis vary within a range from 0 to 100. Specifically, the valve openings of the switching valves VS-1, VS-2 vary from 0 in a fully closed state to 100 in a fully open state, and the valve openings of the switching valves VD-1, VD-2 vary from 0 in a fully closed state to the maximum valve openings which are suitably established.

The respective graphs for representing the relationship between the valve openings of the respective switching valves (VS-1, VS-2, VD-1 and VD-2) and the input signal value shown in FIG. 3 are expressed using four kinds of setting values MO, LI, CC and DZ by the following formulas.

The four kinds of setting values MO, LI, CC and DZ shown in FIG. 3 are determined respectively as follows: Specifically, an absolute value of the input signal value when the switching valves VS-1, VS-2 are fully opened (MAX OPENING) is expressed as MO, and a value set as the maximum valve opening (LIMIT) of the switching valves VD-1, VD-2 is expressed as L1. An absolute value of the maximum input signal value or the minimum input signal value in two chamber connecting zone (CHAMBER CONNECT) where the two chambers 11, 12 communicate with each other is expressed as CC, and an absolute value of the maximum input signal value or the minimum input signal value when the valve openings of the switching valves VD-1 and VD-2 are in a zone of zero (referred to as valve opening dead zone) (DEAD ZONE) is expressed as DZ.

As is apparent from FIG. 3, a symmetrical graph with respect to a center line which is a vertical axis when the input signal value is 0 is drawn, and the four switching valves (VS-1, VS-2, VD-1 and VD-2) used in two sets of chambers 11, 12 shown in FIG. 2 are controlled by a single input signal.

The degrees of opening and closing of the respective switching valves, i.e., the valve openings vary with a change of a trapezoidal waveform signal value IV inputted to the respective switching valves, and thus vary respectively according to the following formulas.

The formula of valve opening change of the switching valve VS-1 . . . $(100/(CC+MO))\times(-IV+CC)$ The formula of valve opening change of the switching valve VS-2 . . . $(100/(CC+MO))\times(IV+CC)$ The formula of valve opening change of the switching valve VD-1 . . . $(L1/(100-DZ))\times(IV-DZ)$ The formula of valve opening change of the switching valve VD-2 . . . $(L1/(100-DZ))\times(-IV-DZ)$ The input signal to the respective switching valves takes the value from −100(%) to +100(%) as shown in the horizontal axis of FIG. 3, and a trapezoidal wave as the input signal will be described below.

Figure 4:
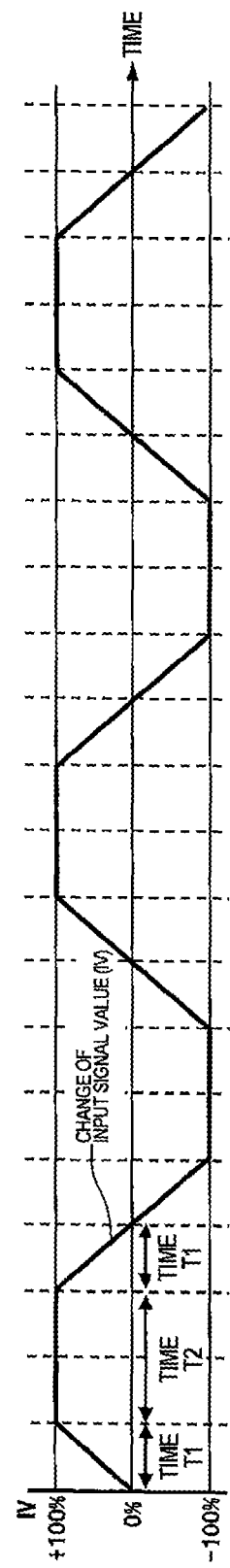
FIG. 4 is a view showing a trapezoidal waveform signal which shows the relationship between the input signal value IV and time.

FIG. 4 shows a trapezoidal waveform signal showing the relationship between the input signal value (input value) IV and time. The trapezoidal waveform is constituted by time T1 and time T2, and the input signal IV as the trapezoidal wave shows the value from −100(%) to +100(%) to the respective switching valves.

The time T1 is time that causes the input signal value IV to vary from 0 to 100%, from 100 to 0%, from 0 to −100%, and from −100 to 0%, and the time required for opening and closing of the respective switching valves can be adjusted by setting the time T1 suitably.

The time T2 is retention time after the input signal value IV reaches 100% and −100%, and the retention time after opening and closing of the respective switching valves can be adjusted by setting the time T2 suitably.

Next, the input signal to the respective switching valves and the sequential operation of the respective switching valves will be described with reference to FIG. 5.

Figure 5:
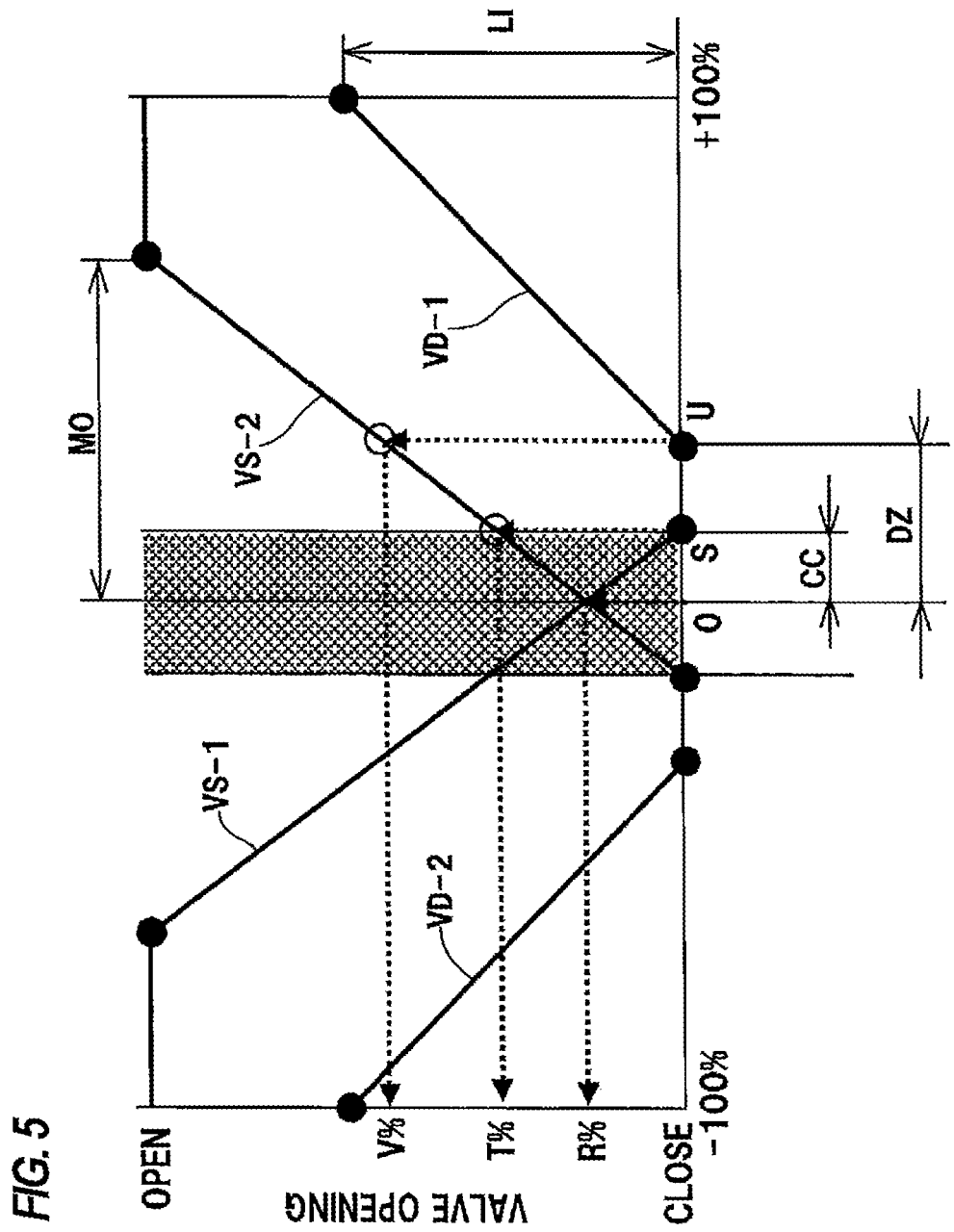
FIG. 5 is a graph showing the relationship between the valve openings of the switching valves (vertical axis) and an input signal (horizontal axis)

FIG. 5 shows the relationship between the valve openings of the switching valves (vertical axis) and the input signal (horizontal axis). R (%), T (%) and V (%) for representing the valve openings of the switching valve are shown along the vertical axis of FIG. 5 at the left end of FIG. 5 for the sake of convenience. Further, S (%) and U (%) of the input signal value IV are shown along the horizontal axis of FIG. 5. The valve openings of the respective switching valves (VS-1, VS-2, VD-1 and VD-2) vary based on predetermined setting values (MO, LI, CC and DZ) in response to the input signal.

For example, in the case where the input signal value is 0%, the valve openings of VS-1 and VS-2 are R %, and the valve openings of VD-1 and VD-2 are 0%. In the case where the input signal value is S %, the valve opening of VS-1 is 0%, the valve opening of VS-2 is T %, and the valve openings of VD-1 and VD-2 are 0%. Further, in the case where the input signal value is U %, the valve opening of VS-1 is 0%, the valve opening of VS-2 is V %, and the valve openings of VD-1 and VD-2 are 0%. In the case where the input signal value is 100%, the valve opening of VS-1 is 0%, the valve opening of VS-2 is fully opened (100%), the valve opening of VD-1 is the maximum valve opening (LIMIT), and the valve opening of VD-2 is 0%.

As is apparent from FIGS. 3 and 5, in the case where the input signal value IV is 0%, VS-1 and VS-2 become a valve opening defined by MO and CC (corresponding to intersection of both graphs), and VD-1 and VD-2 are fully closed. In the case where the input signal value IV varies from 0% to +100%, the valve opening of VS-1 becomes smaller and VS-1 is eventually fully closed, the valve opening of VD-1 becomes larger and VD-1 eventually becomes the maximum valve opening defined by L1, and the valve opening of VS-2 becomes larger and VS-2 is eventually fully opened and VD-2 is fully closed. In the case where the input signal value IV is +100%, VS-1 is fully closed, VD-1 retains the valve opening defined by L1, and VS-2 is fully opened and VD-2 is fully closed. In the case where the input signal value IV varies from +100% to 0%, VS-1 becomes the valve opening defined by MO and CC from the fully-closed state, VD-1 becomes a fully-closed state from the valve opening defined by L1, and the valve opening of VS-2 becomes smaller and VS-2 eventually becomes a valve opening defined by MO and CC and VD-2 is fully closed.

In the case where the input signal value IV varies from 0% to −100%, VS-1 becomes a fully-opened state from the valve opening defined by MO and CC, VD-1 is fully closed, the valve opening of VS-2 becomes smaller and VS-2 is eventually fully closed and VD-2 becomes a valve opening defined by LI from the fully-closed state. In the case where the input signal value is −100%, VS-1 is fully opened, VD-1 is fully closed, VS-2 is fully closed, and VD-2 retains the valve opening defined by L1. In the case where the input signal value IV varies from −100% to 0%, VS-1 becomes a valve opening defined by MO and CC from the fully-opened state, VD-1 is fully closed, VS-2 becomes a valve opening defined by MO and CC from the fully-closed state, and VD-2 becomes a fully-closed state from the valve opening defined by LI.

Figure 6:
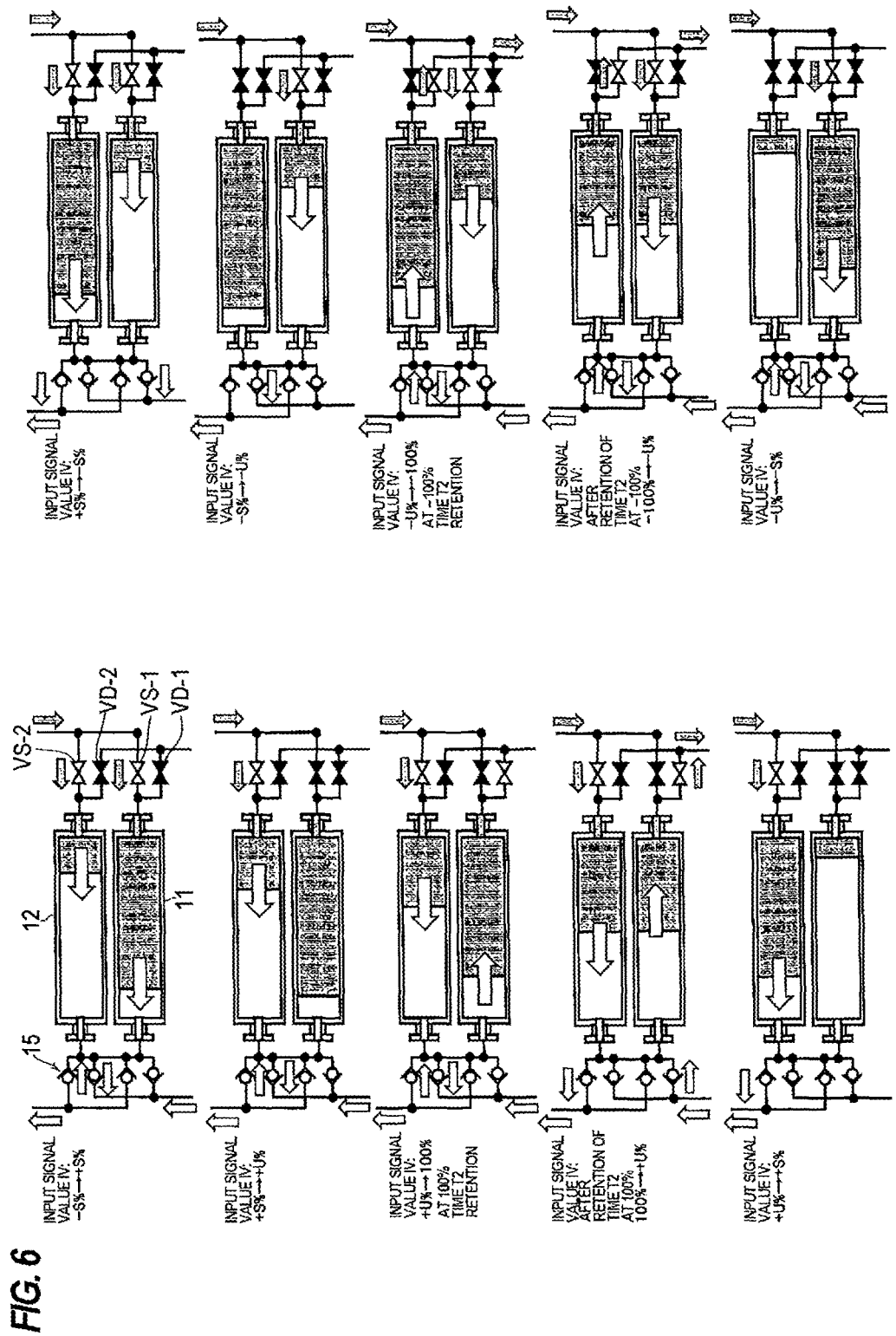
FIG. 6 is a view showing the state of the energy recovery apparatus associated with a change of the input signal value using the input signal values O, S, U, and ±100% shown in FIG. 5.

FIG. 6 is a schematic view showing an energy recovery process in the energy recovery device 10 shown in FIG. 2, and a view showing the state of the energy recovery apparatus associated with a change of the input signal value shown in FIG. 5. S % and U % in FIG. 6 are identical to S % and U % in FIG. 5.

In the case where the input signal value IV is from −S % to +S %, the respective switching valves are as follows: VS-1 is open, VS-2 starts to be opened, VD-1 is closed, and VD-2 is closed. The supply of the concentrated seawater to the energy recovery chamber 11 is continued and the discharge of the high-pressure seawater from the energy recovery chamber 11 is continued, and the supply of the concentrated seawater to the energy recovery chamber 12 is started and the discharge of the high-pressure seawater from the energy recovery chamber 12 is started. At this time, the interface between the concentrated seawater and the seawater moves from right to left in the energy recovery chamber 11, and moves from right to left in the energy recovery chamber 12.

In the case where the input signal value IV is from +S % to +U %, the respective switching valves are as follows: VS-1 is started to be closed, VS-2 is open, VD-1 is closed, and VD-2 is closed. The supply of the concentrated seawater to the energy recovery chamber 11 is stopped and the discharge of the high-pressure seawater from the energy recovery chamber 11 is stopped, and the supply of the concentrated seawater to the energy recovery chamber 12 is continued and the discharge of the high-pressure seawater from the energy recovery chamber 12 is continued. At this time, the interface between the concentrated seawater and the seawater is stopped at the left end of the movable zone in the energy recovery chamber 11, and moves from right to left in the energy recovery chamber 12.

In the case where the input signal value IV is from +U % to 100%, the respective switching valves are as follows: VS-1 is closed, VS-2 is open, VD-1 is started to be opened, and VD-2 is closed. The supply of the low-pressure seawater to the energy recovery chamber 11 is started and the discharge of the concentrated seawater from the energy recovery chamber 11 is started, and the supply of the concentrated seawater to the energy recovery chamber 12 is continued and the discharge of the high-pressure seawater from the energy recovery chamber 12 is continued. At this time, the interface between the concentrated seawater and the seawater moves from left to right in the energy recovery chamber 11, and moves from right to left in the energy recovery chamber 12. The state in which the input signal value is 100% is retained for a predetermined time (T2).

In the case where the input signal value becomes from 100% to +U % after the state in which the input signal value IV is 100% is retained for a predetermined time (T2), the respective switching valves are as follows: VS-1 is closed, VS-2 is open, VD-1 is open, and VD-2 is closed. The supply of the low-pressure seawater to the energy recovery chamber 11 is continued and the discharge of the concentrated seawater from the energy recovery chamber 11 is continued, and the supply of the concentrated seawater to the energy recovery chamber 12 is continued and the discharge of the high-pressure seawater from the energy recovery chamber 12 is continued. At this time, the interface between the concentrated seawater and the seawater moves from left to right in the energy recovery chamber 11, and moves from right to left in the energy recovery chamber 12.

In the case where the input signal value IV is from +U % to +S %, the respective switching valves are as follows: VS-1 is closed, VS-2 is open, VD-1 is started to be closed, and VD-2 is closed. The supply of the low-pressure seawater to the energy recovery chamber 11 is stopped and the discharge of the concentrated seawater from the energy recovery chamber 11 is stopped, and the supply of the concentrated seawater to the energy recovery chamber 12 is continued and the discharge of the high-pressure seawater from the energy recovery chamber 12 is continued. At this time, the interface between the concentrated seawater and the seawater is stopped at the right end of the movable zone in the energy recovery chamber 11, and moves from right to left in the energy recovery chamber 12.

In the case where the input signal value IV is from +S % to −S %, the respective switching valves are as follows: VS-1 is started to be opened, VS-2 is open, VD-1 is closed, and VD-2 is closed. The supply of the concentrated seawater to the energy recovery chamber 11 is started and the discharge of the high-pressure seawater from the energy recovery chamber 11 is started, and the supply of the concentrated seawater to the energy recovery chamber 12 is continued and the discharge of the high-pressure seawater from the energy recovery chamber 12 is continued. At this time, the interface between the concentrated seawater and the seawater moves from right to left in the energy recovery chamber 11, and moves from right to left in the energy recovery chamber 12.

In the case where the input signal value IV is from −S % to −U %, the respective switching valves are as follows: VS-1 is open, VS-2 is started to be closed, VD-1 is closed, and VD-2 is closed. The supply of the concentrated seawater to the energy recovery chamber 11 is continued and the discharge of the high-pressure seawater from the energy recovery chamber 11 is continued, and the supply of the concentrated seawater to the energy recovery chamber 12 is stopped and the discharge of the high-pressure seawater from the energy recovery chamber 12 is stopped. At this time, the interface between the concentrated seawater and the seawater moves from right to left in the energy recovery chamber 11, and is stopped at the left end of the movable zone in the energy recovery chamber 12.

In the case where the input signal value IV is from −U % to −100%, the respective switching valves are as follows: VS-1 is open, VS-2 is closed, VD-1 is closed, and VD-2 is started to be opened. The supply of the concentrated seawater to the energy recovery chamber 11 is continued and the discharge of the high-pressure seawater from the energy recovery chamber 11 is continued, and the supply of the low-pressure seawater to the energy recovery chamber 12 is started and the discharge of the concentrated seawater from the energy recovery chamber 12 is started. At this time, the interface between the concentrated seawater and the seawater moves from right to left in the energy recovery chamber 11, and moves from left to right in the energy recovery chamber 12. The state in which the input signal value is −100% is retained for a predetermined time (T2).

In the case where the input signal value becomes from −100% to −U % after the state in which the input signal value IV is −100% is retained for a predetermined time (T2), the respective switching valves are as follows: VS-1 is open, VS-2 is closed, VD-1 is closed, and VD-2 is open. The supply of the concentrated seawater to the energy recovery chamber 11 is continued and the discharge of the high-pressure seawater from the energy recovery chamber 11 is continued, and the supply of the low-pressure seawater to the energy recovery chamber 12 is continued and the discharge of the concentrated seawater from the energy recovery chamber 12 is continued. At this time, the interface between the concentrated seawater and the seawater moves from right to left in the energy recovery chamber 11, and moves from left to right in the energy recovery chamber 12.

In the case where the input signal value IV is from −U % to −S %, the respective switching valves are as follows: VS-1 is open, VS-2 is closed, VD-1 is closed, and VD-2 is started to be closed. The supply of the concentrated seawater to the energy recovery chamber 11 is continued and the discharge of the high-pressure seawater from the energy recovery chamber 11 is continued, and the supply of the low-pressure seawater to the energy recovery chamber 12 is stopped and the discharge of the concentrated seawater from the energy recovery chamber 12 is stopped. At this time, the interface between the concentrated seawater and the seawater moves from right to left in the energy recovery chamber 11, and is stopped at the right end of the movable zone in the energy recovery chamber 12.

Figure 7:
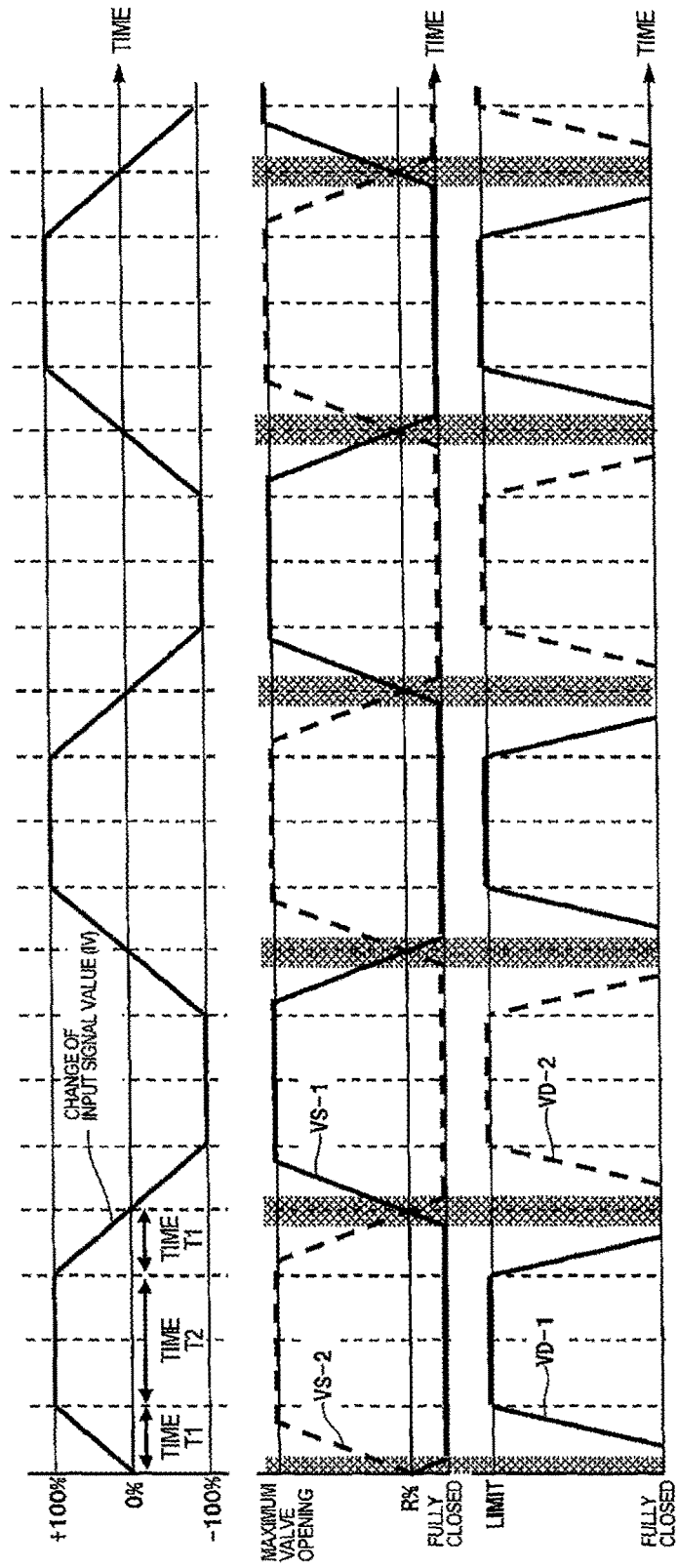
FIG. 7 is a view showing opening and closing operation of the switching valves in the case where the input signal value IV varies in trapezoidal waveform within a range of ±100%.

FIG. 7 is a view showing opening and closing operation of the switching valves in the case where the input signal value IV varies in a trapezoidal waveform within a range of ±100%. As shown in FIG. 7, the respective switching valves (VS-1, VS-2, VD-1 and VD-2) perform a predetermined operation in response to the input signal to the respective switching valves, i.e., the plural switching valves perform respective individual operations in response to a single input signal. The upper graph of FIG. 7 shows a trapezoidal waveform signal inputted into the respective switching valves, the intermediate graph shows opening and closing operation of the switching valve VS-1 (bold solid line) and the switching valve VS-2 (bold dotted line), and the lower graph shows opening and closing operation of the switching valve VD-1 (bold solid line) and the switching valve VD-2 (bold dotted line).

As shown in the upper graph of FIG. 7, the trapezoidal waveform is constituted by time T1 and time T2, and the input signal IV as a trapezoidal wave shows the value between −100(%) and +100(%) to the respective switching valves. The time T1 is time that causes the input signal value IV to vary from 0 to 100%, from 100 to 0%, from 0 to −100% and from −100 to 0%, and the time required for opening and closing of the respective switching valves can be adjusted by setting the time T1 suitably. The time T2 is retention time after the input signal value IV reaches 100% and −100%, and the retention time after opening and closing of the respective switching valves can be adjusted by setting the time T2 suitably.

As shown in the intermediate graph of FIG. 7, the switching valve VS-1 continues closing operation, and after the switching valve VS-1 is fully closed, the switching valve VS-1 continues a fully closed state for a predetermined time. Thereafter, the switching valve VS-1 starts to be opened, and after the switching valve VS-1 becomes the maximum valve opening, the switching valve VS-1 continues its state for a predetermined time. Then, the switching valve VS-1 starts to be closed, and a sequence of operation is repeated. The switching valve VS-2 continues opening operation, and after the switching valve VS-2 becomes the maximum valve opening, the switching valve VS-2 continues its state for a predetermined time. Thereafter, the switching valve VS-2 starts to be closed, and after the switching valve VS-2 is fully closed, the switching valve VS-2 continues the fully-closed state for a predetermined time. Then, the switching valve VS-2 starts to be opened, and a sequence of operation is repeated. In the operation of the switching valves VS-1 and VS-2, the predetermined time for continuing the maximum valve opening is longer than the time T2, and the predetermined time for continuing the fully-closed state is longer than duration time of the maximum valve opening state.

As shown in the lower graph of FIG. 7, after the switching valve VD-1 continues the fully-closed state, the switching valve VD-1 starts to be opened, and after the switching valve VD-1 reaches a preset maximum valve opening (LIMIT), the switching valve VD-1 continues the open state until the time T2 elapses. Thereafter, the switching valve VD-1 starts to be closed, and after the switching valve VD-1 becomes a fully-closed state, the switching valve VD-1 continues the fully-closed state while the input signal is in a valve opening dead zone (DEAD ZONE). When the above interval is taken as ½ cycle, the switching valve VD-2 performs the same operation in the subsequent ½ cycle. Specifically, after the switching valve VD-2 continues the fully-closed state, the switching valve VD-2 starts to be opened, and after the switching valve VD-2 reaches a preset maximum valve opening (LIMIT), the switching valve VD-2 continues the open state until the time T2 elapses. Thereafter, the switching valve VD-2 starts to be closed, and after the switching valve VD-2 becomes a fully-closed state, the switching valve VD-2 continues the fully-closed state while the input signal is in a valve opening dead zone (DEAD ZONE).

Figure 8:
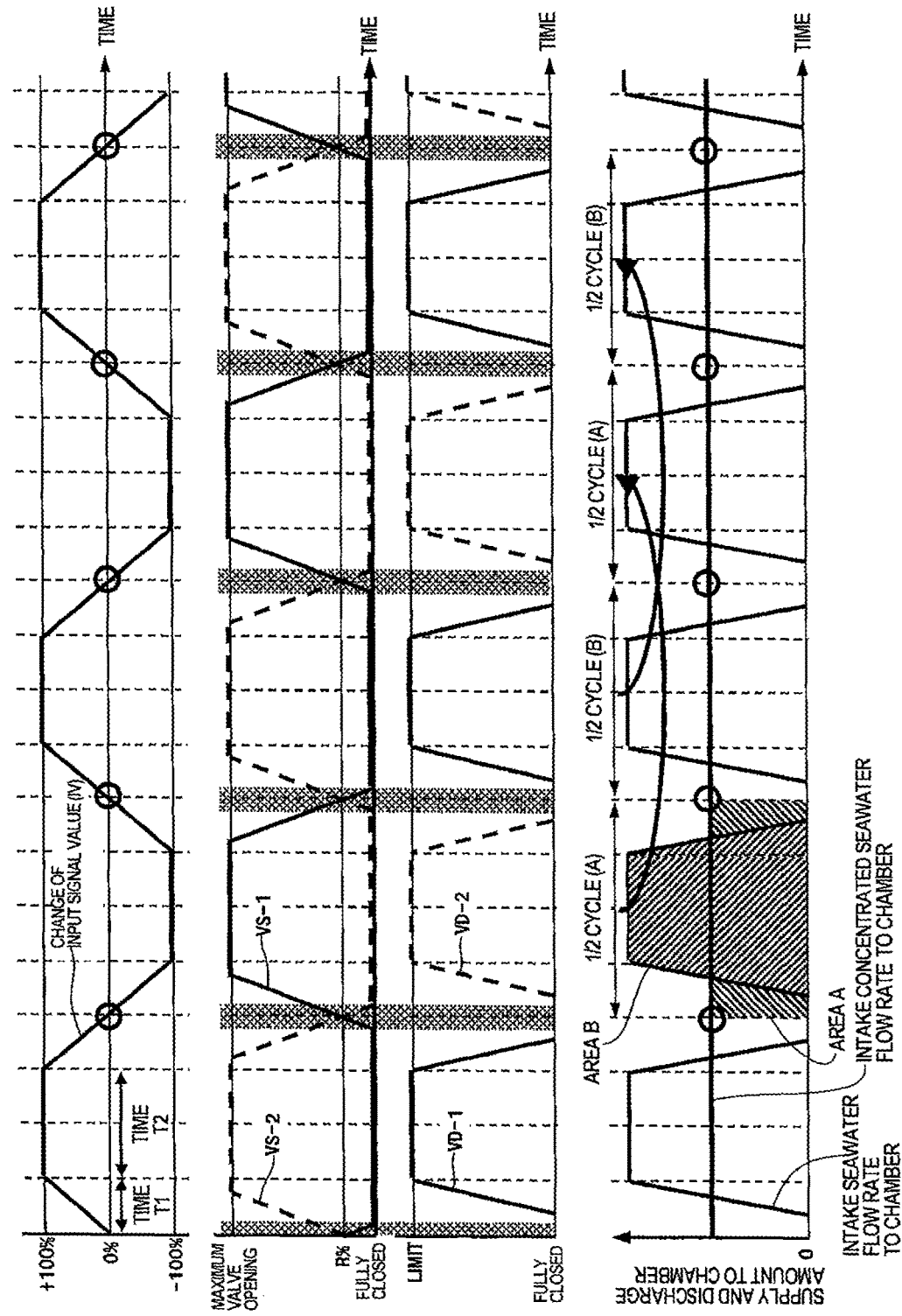
FIG. 8 shows graphs showing the relationship between the input signal to the switching valves, opening and closing operation of the switching valves, intake seawater flow rates to the energy recovery chambers and intake concentrated seawater flow rates to the energy recovery chambers.

FIG. 8 shows graphs showing the relationship between the input signal to the switching valves, opening and closing operation of the switching valves VS-1 and VS-2, opening and closing operation of the switching valves VD-1 and VD-2, intake seawater flow rates to the energy recovery chambers 11 and 12, and intake concentrated seawater flow rates to the energy recovery chambers 11 and 12. The three graphs from above in FIG. 8 are identical to the three graphs shown in FIG. 7 and will not be described in duplication. The lowest graph in FIG. 8 shows intake seawater flow rates to the energy recovery chambers 11 and 12 and intake concentrated seawater flow rates to the energy recovery chambers 11 and 12 when the respective switching valves are in the opening and closing states shown in FIG. 8 in response to a change in the input signal value to the switching valves. As shown in the lowest graph in FIG. 8, the chamber-intake seawater flow rate repeats a trapezoidal change, and the chamber-intake concentrated seawater flow rate is constant in the whole process.

Here, the chamber-intake seawater flow rate and the chamber-discharge concentrated seawater flow rate show the same change, and the chamber-intake concentrated seawater flow rate and the chamber-discharge seawater flow rate show the same change.

Specifically, the relationship between the input signal and the intake seawater flow rates to the energy recovery chamber 11 and 12 are as follows:

When the input signal is 0, the intake seawater flow rate to the energy recovery chamber 11 is 0. When the input signal value becomes U % (see FIG. 5), i.e., exceeds the valve opening dead zone (DEAD ZONE), the seawater intake to the energy recovery chamber 11 is started. When the input signal becomes +100, the seawater intake to the energy recovery chamber 11 becomes a constant flow rate, and retains the constant flow rate while the input signal is +100 (during the time T2). When the input signal starts to decrease from +100, the seawater intake to the energy recovery chamber 11 also decreases, and when the input signal value becomes U %, the seawater intake is finished. The intake seawater flow rate is 0 until the input signal value becomes −U %, and when the input signal value decreases and becomes smaller than −U %, the seawater intake to the energy recovery chamber 12 is started. When the input signal becomes −100, the seawater intake to the energy recovery chamber 12 becomes a constant flow rate, and retains the constant flow rate while the input signal is −100 (during the time T2). When the input signal starts to increase from −100, the seawater intake to the energy recovery chamber 12 decreases, and when the input signal value becomes −U %, the seawater intake is finished. The intake seawater flow rate is 0 until the input signal value becomes from −U % to 0. The cycle until when the input signal value becomes 0 subsequently from the previous 0 is ½ cycle.

On the other hand, the relationship between the input signal and the intake concentrated seawater flow rates to the energy recovery chambers 11 and 12 are as follows:

When the input signal value is 0, the concentrated seawater is taken into the energy recovery chambers 11 and 12, and when the input signal value becomes S %, the concentrated seawater intake to the energy recovery chamber 11 is stopped. However, the concentrated seawater continues to be taken into the energy recovery chamber 11. When the valve opening of the switching valve VS-2 becomes the maximum valve opening, an intake amount of the concentrated seawater becomes constant. Thereafter, while the input signal value is +100% (during the time T2), the intake amount of the concentrated seawater is constant. The intake amount of the concentrated seawater to the chamber 12 is constant until when the input signal value starts to decrease from +100% and the valve opening of the switching valve VS-2 becomes the maximum valve opening, and then the intake amount decreases. When the input signal value becomes S %, the concentrated seawater intake to the chamber 11 is started. While the input signal value is from S % to −S %, the concentrated seawater is taken into both the chambers 11 and 12. When the input signal value becomes −S %, the concentrated seawater intake to the chamber 12 is stopped. However, the concentrated seawater continues to be taken into the energy recovery chamber 11. When the valve opening of the switching valve VS-1 becomes the maximum valve opening, the intake amount of the concentrated seawater becomes constant. Thereafter, while the input signal value is −100% (during the time T2), the intake amount of the concentrated seawater is constant. The intake amount of the concentrated seawater to the chamber 11 is constant until when the input signal value starts to increase from −100% and the valve opening of the switching valve VS-1 becomes the maximum valve opening, and then the intake amount decreases. When the input signal value becomes −S %, the concentrated seawater intake to the chamber 12 is started. While the input signal value is from −S % to 0% (+S %), the concentrated seawater is taken into both the chambers 11 and 12. The input signal value and the intake state of the concentrated seawater to the respective chambers take the above aspects. However, as illustrated, the intake concentrated seawater flow rate to the chamber is always constant.

Next, in the energy recovery device 10 according to the present invention, a control method for achieving the operation of the energy recovery apparatus as shown in FIGS. 6 and 8 will be described.

Figure 10:
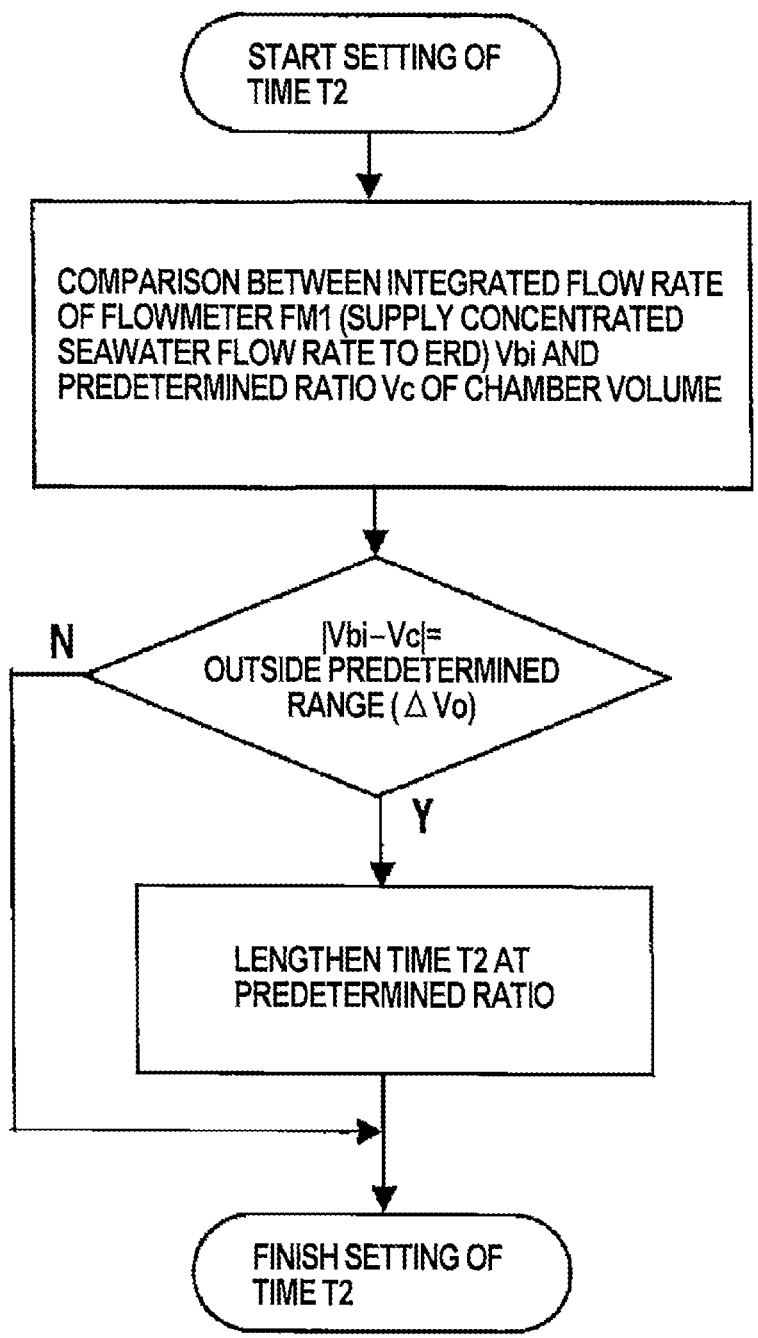
FIG. 10 is a flow chart showing a sequence of setting the time T2 shown in FIG. 9.

(1) The range of the input signal value IV is separated with ±S %, ±U %, ±100% as shown in FIG. 6, and 10 modes are shown.

In the case where the input signal value IV is from −S % to +S % and from +S % to −S %, the contact interfaces between the concentrated seawater and the seawater perform a process for pressurizing the seawater concurrently.

Thus, it is possible to suppress pulsation of the pressurized seawater discharged from the energy recovery apparatus to the booster pump.

(2) The setting (control) of the maximum valve opening of the switching valves VD-1 and VD-2 at the concentrated seawater discharge side (seawater supply side) is made so that the integrated flow rate of the concentrated seawater supplied to the energy recovery apparatus≤the integrated flow rate of the seawater supplied to the energy recovery apparatus and the difference in both the integrated flow rates can be adjusted.

Thus, the following can be achieved.

1) The concentrated seawater does not flow into the booster pump from the energy recovery apparatus.

2) The seawater is not discharged from the energy recovery apparatus more than necessary.

Further, by setting the maximum valve opening (LIMIT) of the switching valves VD-1 and VD-2 suitably, it is possible to adjust the integrated flow rate of the concentrated seawater supplied to the energy recovery apparatus and the integrated flow rate of the seawater supplied to the energy recovery apparatus freely.

The timing of switching the respective switching valves by the above control method (i.e. by changing the input signal value), and automatic adjustment of supply concentrated seawater flow rate and supply seawater flow rate will be described more specifically. In the operation of the energy recovery apparatus, the following automatic adjustment of the respective switching valves can be performed.

(1) With regard to adjustment of switching time of the respective switching valves Here, the switching time of the respective switching valves indicates time T1 and time T2 shown in FIGS. 7 and 8, and thus is the factor for determining the trapezoidal waveform of the input signal.

As shown in the upper graphs of FIGS. 7 and 8, when the input signal value takes the value between 0% and +100% in ½ cycle, i.e., the time T1, it is the time to be performing the opening and closing operation in any of the switching valves. During this time T1, the flow rate of the concentrated seawater (or seawater) taken (supplied) into the chamber is not constant, and thus it is impossible to predict the time when the chamber is filled with the concentrated seawater (or seawater), on the basis of the non-constant flow rate.

On the other hand, while the input signal value retains the value of +100%, i.e., the time T2, all of the switching valves are in an open state or in a closed state and do not perform opening and closing operation. Therefore, the flow rate of the concentrated seawater (or seawater) taken (supplied) into the chamber is constant, and thus it is possible to predict the time when the chamber is filled with the concentrated seawater (or seawater), on the basis of the constant flow rate. The same holds true for the subsequent ½ cycle.

1) The first aspect for setting switching time (time T1 and T2) of the switching valves i) The switching time T1 of the switching valve is set to a predetermined value.

ii) The time T2 calculates and sets the time preliminarily until the energy recovery chamber is filled with the concentrated seawater, from the volume of the energy recovery chamber and the inflow amount of the concentrated seawater.

At this time, in order to avoid the inflow of the concentrated seawater into the booster pump reliably, for example, a method for making the volume of the energy recovery chamber smaller than the actual volume by a few % to a few dozen % at the time of calculation, or a method for setting the time shorter than the calculated time by a few % to a few dozen %, or other methods may be used.

2) The second aspect for setting switching time (time T1 and T2) of the switching valves i) The switching time T1 of the switching valve is set to a predetermined value.

ii) The time T2 is automatically set in response to the concentrated seawater flow rate measured by the flowmeter FM1.

Specifically, the integration of the measured values of the flowmeter FM1 is started from when the switching valve VS-1 or VS-2 starts to be opened, and when the integrated value reaches a predetermined ratio (80-90%) (initial setting value) of the actual volume of the energy recovery chamber, the input signal value is changed so that the switching valve VS-1 or VS-2 is closed. Since the intake concentrated seawater flow rate measured by the flowmeter FM1 is equal to the discharge seawater flow rate measured by the flowmeter FM3, the flowmeter FM3 may be used.

The operation is performed as follows:

As shown in the top right in FIG. 6, the integration of the concentrated seawater flow rate to the chamber 11 is started from when the switching valve VS-1 starts to be opened, and when the integrated value reaches a predetermined ratio (80-90%) of the actual volume of the energy recovery chamber, time T2 is finished and the switching valve VS-1 is closed.

As shown in the top left in FIG. 6, the integration of the concentrated seawater flow rate to the chamber 12 is started from when the switching valve VS-2 starts to be opened, and when the integrated value reaches a predetermined ratio (80-90%) of the actual volume of the energy recovery chamber, time T2 is finished and the switching valve VS-2 is closed.

As described above, an adjustment method of the switching time T2 is as follows: The integration of supply concentrated seawater flow rate to the energy recovery apparatus is performed during time from when the switching valve VS-1 or VS-2 starts to be opened till when the switching valve VS-1 or VS-2 is closed. If the integrated flow rate value is not less than the volume of the energy recovery chamber (or a predetermined ratio of the actual volume of the chamber), the time T2 is shortened at the subsequent cycle. If the integrated flow rate value is not more than the volume of the energy recovery chamber (or a predetermined ratio of the actual volume of the chamber), the time T2 is lengthened at the subsequent cycle.

An increase and decrease amount in the time T2 at the subsequent cycle may be preset or may be changed depending on deviation from the volume of the energy recovery chamber. Specifically, if the deviation is large, the increase and decrease amount is made larger, and if the deviation is small, the increase and decrease amount is made smaller.

(2) With regard to adjustment (control) method of the valve openings of the switching valves VD-1 and VD-2 at the concentrated seawater discharge side (seawater supply side)

The adjustment (control) method is that a balance between the amount of supply concentrated seawater to the energy recovery chamber and the amount of supply seawater to the energy recovery chamber is achieved by automatically adjusting the maximum valve opening (LIMIT) of the switching valves VD-1, VD-2.

The lowest graph of FIG. 8 shows the supply seawater flow rate to the energy recovery chamber and the supply concentrated seawater flow rate to the energy recovery chamber.

The supply seawater flow rate to the energy recovery chamber is as follows: The intake seawater flow rate to the energy recovery chamber is not constant, but increases or decreases during the time T1, and the intake seawater flow rate is largest and constant during the time T2. Further, the intake seawater flow rate becomes 0 while the input signal value is from 0 to U % and from 0 to −U % (see FIG. 5) during which the switching valves VD-1 and VD-2 are fully closed.

On the other hand, the intake concentrated seawater flow rate to the energy recovery chamber is constant.

Here, as a condition for enabling the concentrated seawater supplied to the energy recovery apparatus not to flow into the booster pump, it is necessary to equalize the amount of the concentrated seawater and the amount of the seawater which are introduced into or discharged from each chamber.

As shown in the lowest graph of FIG. 8, in ½ cycle (A), the concentrated seawater is taken into the chamber, and the integrated value of the intake concentrated seawater flow rate at this time becomes a rectangular area A. On the other hand, when the input signal value is from U to 100% (or −U to −100%), the seawater is taken into the chamber, and the integrated value of the intake seawater flow rate at this time becomes a trapezoidal area B. As a condition for enabling the concentrated seawater supplied to the energy recovery apparatus not to flow into the booster pump, it is necessary to equalize the area A and the area B. The same holds true for the subsequent ½ cycle (B). If the present measures are not taken, the energy recovery chamber is gradually filled with only the concentrated seawater, and the concentrated seawater eventually flows into the booster pump and is then introduced into the reverse-osmosis membrane (RO membrane), resulting in lowering the desalting rate or accelerating the deterioration of the reverse-osmosis membrane (RO membrane).

Therefore, according to the present invention, the valve openings of the switching valves VD-1 and VD-2 are controlled so that the integrated value of the supply concentrated seawater and the integrated value of the supply seawater in each chamber in the process of the supply and discharge of the concentrated seawater and the seawater in the energy recovery apparatus meet the following condition.

The integrated value of the supply seawater flow rate to the energy recovery apparatus≥the integrated value of the supply concentrated seawater flow rate to the energy recovery apparatus Thus, the state where the concentrated seawater does not flow into the booster pump at all times can be maintained.

Further, in order to prevent the energy (pressure, flow rate) of the supply concentrated seawater to the energy recovery apparatus from being lost, the valve openings of the switching valves VS-1 and VS-2 at the supply concentrated seawater side of the energy recovery apparatus are fully opened basically.

Further, regardless of the above condition, it is possible to adjust the supply seawater flow rate to the energy recovery chamber and the supply concentrated seawater flow rate to the energy recovery apparatus by controlling the valve openings of the switching valves VD-1 and VD-2.

The lowest graph of FIG. 8 shows the process for controlling the valve openings of the switching valves VD-1 and VD-2 automatically by comparing the integrated value of the supply concentrated seawater to the energy recovery apparatus and the integrated value of the supply seawater (discharge concentrated seawater) to the energy recovery apparatus between the ½ cycles in the process operation of the switching valves.

FIG. 8 further shows the trapezoidal wave of the input signal, the opening and closing operation of the switching valves VS-1 and VS-2, and the opening and closing operation of the switching valves VD-1 and VD-2. These operations are performed in the same manner as those in FIG. 7.

The lowest graph of FIG. 8 shows the intake concentrated seawater flow rate and the intake seawater flow rate to the energy recovery apparatus with a change in the input signal value.

1) In the ½ cycle (A), the integration of the measured values of the flowmeter FM1 for measuring the intake concentrated seawater flow rate to the energy recovery apparatus is started from when the input signal value is 0% (the switching valve VS-1 is in an open state). Since the intake concentrated seawater flow rate measured by the flowmeter FM1 and the discharge seawater flow rate measured by the flowmeter FM3 are equal to each other, the flowmeter FM3 may be used.

At the same time, the integration of the measured values of the flowmeter FM4 for measuring the intake seawater flow rate to the energy recovery apparatus is started. Since the intake seawater flow rate measured by the flowmeter FM4 and the discharge concentrated seawater flow rate measured by the flowmeter FM2 are equal to each other, the flowmeter FM2 may be used.

2) At the end of ½ cycle (A), the integration of the intake concentrated seawater flow rate and the integration of the intake seawater flow rate are finished. The integrated value of the intake concentrated seawater flow rate at this time becomes a rectangular area A, and the integrated value of the intake seawater flow rate becomes a trapezoidal area B. The integrated value is similarly obtained in the subsequent ½ cycle (B).

3) Next, the integrated value of the intake concentrated seawater flow rate and the integrated value of the intake seawater flow rate are compared, and the valve openings of the switching valves VD-1 and VD-2 are automatically adjusted at the subsequent ½ cycle (A) so that the integrated value of the supply seawater flow rate to the energy recovery apparatus≥the integrated value of the supply concentrated seawater flow rate to the energy recovery apparatus.

Specifically, the comparison result of the integrated value in the ½ cycle (A) is reflected in the subsequent ½ cycle (A). More specifically, the maximum valve opening (LIMIT) of the switching valve VD-2 is adjusted (controlled) by reflecting the comparison result of the integrated value.

An increase and decrease amount of the maximum valve opening (LIMIT) of the switching valve VD-1 or VD-2 may use a predetermined value (setting value) or may be changed depending on the comparison result of the integrated value. More specifically, a method in which if the difference of the integrated values is large, the increase and decrease amount is made larger, and if the difference of the integrated values is small, the increase and decrease amount is made smaller may be used.

The comparison result of the integrated value in the ½ cycle (B) is reflected in the subsequent ½ cycle (B). More specifically, the maximum valve opening (LIMIT) of the switching valve VD-1 is adjusted (controlled) by reflecting the comparison result of the integrated value.

4) While the input signal value increases from 0 to 100% and decreases from 100 to 0% again (or while the input signal value decreases from 0 to −100% and increases from −100 to 0% again), the control of the above 1) to 3) is performed in each ½ cycle from when the switching valves VS-1 and VS-2 start opening until when the switching valves VS-1 and VS-2 finish closing.

In order to meet the condition in the procedure 3) reliably, after multiplying the integrated value of the supply concentrated seawater flow rate to the energy recovery apparatus by a preset coefficient, an attempt to meet the above condition may be performed.

Figure 9:
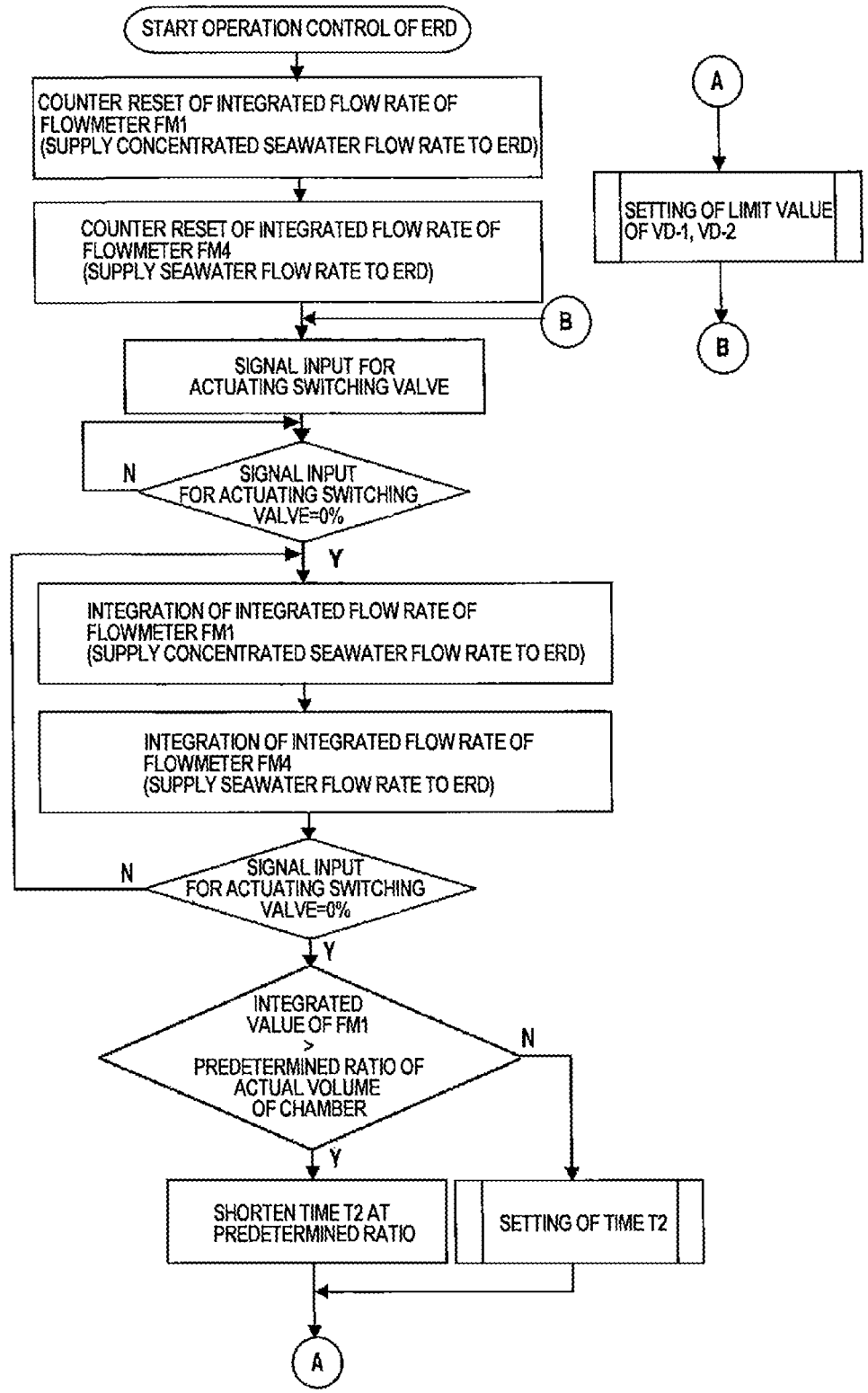
FIG. 9 is a flow chart showing a sequence of a control method for achieving the operation of the energy recovery apparatus according to the present invention.

FIG. 9 is a flow chart showing a sequence of a control method for achieving the operation of the energy recovery apparatus according to the present invention.

In the embodiment shown in FIG. 9, operation control of the energy recovery apparatus (ERD) is started and a counter of the flowmeter FM1 for measuring the supply concentrated seawater flow rate to the energy recovery apparatus is reset. The flowmeter FM1 may be replaced with the flowmeter FM3. Further, a counter of the flowmeter FM4 for measuring the supply seawater flow rate to the energy recovery apparatus is reset. The flowmeter FM4 may be replaced with the flowmeter FM2. Then, the trapezoidal wave signal for actuating the respective switching valves is inputted. It is judged whether the input signal value is 0%, and the integration of the flow rate of the concentrated seawater and the integration of the flow rate of the seawater are started at the time when the input signal value is 0% (the state where the concentrated seawater is supplied to both chambers). The integration of these flow rates is performed until when the input signal value becomes 0% again. Then, the integrated flow rate of the concentrated seawater is compared with a predetermined ratio (e.g. 80-90%) of the actual volume of the chamber, and it is judged whether the integrated flow rate of the concentrated seawater is larger than the predetermined ratio of the actual volume of the chamber. In the case where the comparison result is YES, the time T2 is shortened at a predetermined ratio. In the case where the comparison result is NO, the step is shifted to setting of the time T2 (described later), and the time T2 is set newly. Thereafter, as needed, the maximum valve openings of the switching valves VD-1 and VD-2 are set, and then the step returns to the input of the trapezoidal wave signal.

FIG. 10 is a flow chart showing a sequence of setting the time T2 shown in FIG. 9. The setting of the time T2 is as follows: The integrated flow rate of the concentrated seawater is compared with a predetermined ratio (e.g. 80-90%) of the actual volume of the chamber, and if the integrated flow rate of the concentrated seawater is smaller than the predetermined ratio of the actual volume of the chamber, renewed time T2 is set. Specifically, as shown in FIG. 10, the integrated value (Vbi) of the flow rate of the concentrated seawater obtained by the flowmeter FM1 is compared with the predetermined ratio (Vc) of the actual volume of the chamber, and it is judged whether an absolute value of (Vbi−Vc) falls within a predetermined range (ΔVo). In the case where the absolute value of (Vbi−Vc) falls within the range (ΔVo) (in the case of NO), T2 is not changed and the same time T2 is set. In the case where the absolute value of (Vbi−Vc) falls outside the predetermined range (ΔVo) (in the case of YES), the time T2 is lengthened at a predetermined ratio so that the integrated flow rate value of the concentrated seawater is increased, and the setting of the time T2 finishes.

Figure 11:
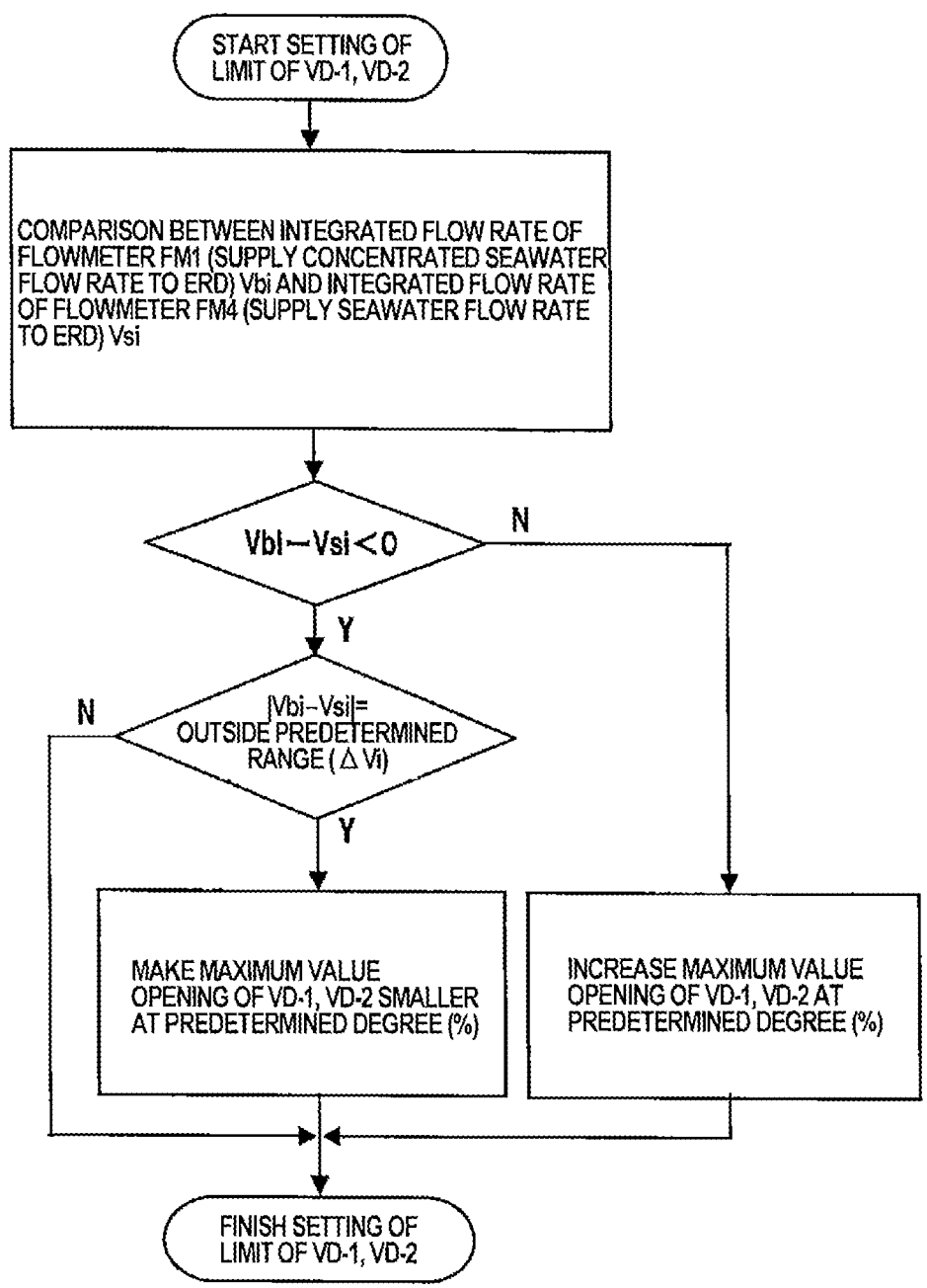
FIG. 11 is a flow chart showing a sequence of setting the maximum valve opening (LIMIT) of the switching valves VD-1 and VD-2 shown in FIG. 9.

FIG. 11 is a flow chart showing a sequence of setting the maximum valve opening (LIMIT) of the switching valves VD-1 and VD-2 shown in FIG. 9.

In FIG. 11, the integrated value (Vbi) of the flow rate of the concentrated seawater obtained by the flowmeter FM1 is compared with the integrated value (Vsi) of the flow rate of seawater obtained by the flowmeter FM4, and it is judged whether Vbi−Vsi<0. In the case of NO (in the case where Vbi is larger than or equal to Vsi), because it is necessary to increase the supply seawater flow rate, the maximum valve opening (LIMIT) is increased at a predetermined degree. In the case of YES (in the case where Vbi is smaller than Vsi), it is judged whether the absolute value of (Vbi−Vsi) falls outside the predetermined range (ΔVi). In the case where the absolute value of (Vbi−Vsi) falls outside the predetermined range (in the case of YES), the maximum valve opening (LIMIT) of the switching valves VD-1 and VD-2 is made smaller at a predetermined degree (%) and the setting of the maximum valve opening finishes. In the case where the absolute value of (Vbi−Vsi) falls within the predetermined range (in the case of NO), the maximum valve opening (LIMIT) of the switching valves VD-1 and VD-2 is left as it is and the setting of the maximum valve opening finishes.

The two switching valves are used for one chamber for the purpose of operating fluid in the energy recovery chamber. In the conventional operation control method, the sequence of opening and closing of the respective switching valves is predetermined, and the opening and closing operation of the switching valves is performed according to the predetermined sequence. However, when the energy recovery apparatus is used in an actual plant, a number of energy recovery apparatuses are used simultaneously. In this case, it is problematic that a great deal of time is required to predetermine the opening and closing sequence of the plural switching valves. Further, an error in the determination of the opening and closing sequence of the plural switching valves tends to occur, and if there is an error, the function of the energy recovery apparatus is lost and an adverse effect is exerted on the whole plant. For example, if a step in which all the switching valves at the concentrated seawater supply sides of the respective energy recovery apparatuses are erroneously closed is formed, shutoff operation of the booster pump is performed, thus leading to a failure of the booster pump. Further, the supply flow rate to the reverse-osmosis membrane-separation apparatus is lowered, and the required flow rate of the fresh water cannot be obtained.

In contrast, according to the present invention, only one kind of input signal can interlock the plural switching valves, and thus it is not necessary to predetermine the opening and closing sequence of the plural switching valves, thus saving time. Further, occurrence of a problem based on the error of the opening and closing sequence of the plural switching valves can be avoided. Specifically, the opening and closing state of the two switching valves installed in each chamber is shown by the valve openings, and the relationship between the valve openings of the switching valves and the inputted signal value is shown using the setting values of the switching valves. In the above-described embodiments, the relationship between the valve openings of the two sets of switching valves, i.e., four switching valves in the two chambers and the input signal value is utilized.

Next, an operation control method by the input signals which set setting values of the switching valves and have a phase difference will be described.

Figure 12A:
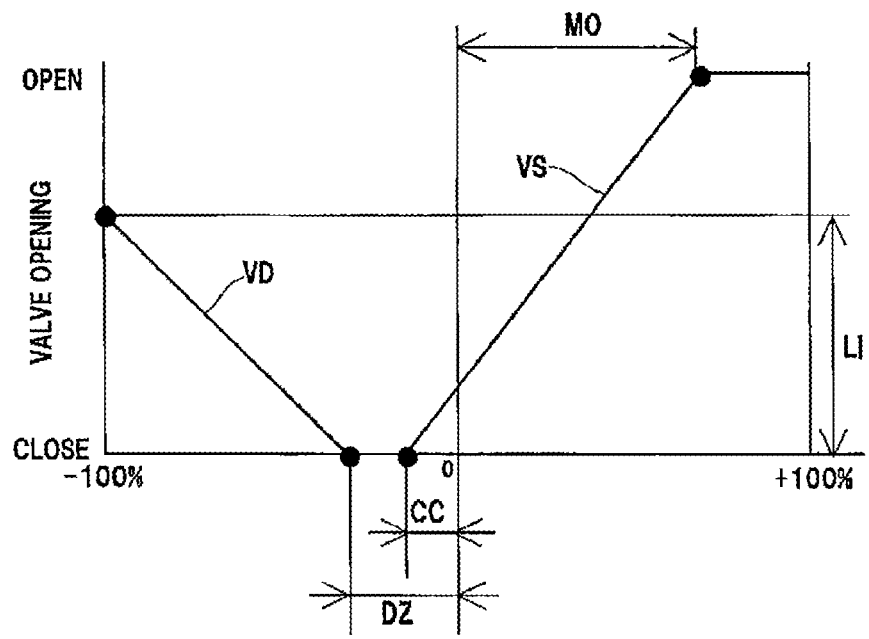
FIG. 12A is a graph showing an input signal to one set of switching valves and operation of the switching valves.
Figure 12B:
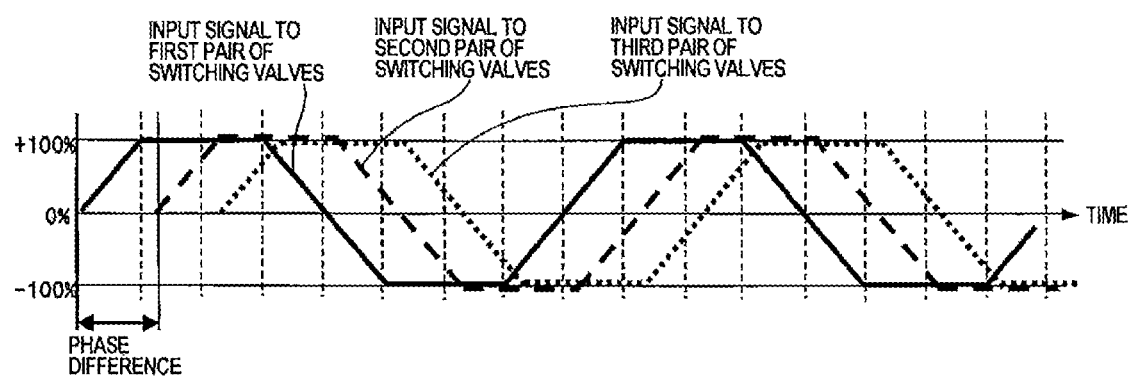
FIG. 12B is a view showing input signals having a phase difference.

FIGS. 12A and 12B are a graph showing an input signal to one set of switching valves and operation of the switching valves, and a view showing input signals which have a phase difference.

For the purpose of operating the fluid in the energy recovery chamber, two switching valves VS and VD are used for one chamber. As shown in FIG. 12A, opening and closing setting values CC, DZ, MO and LI of the switching valves are set, and the degrees of opening and closing, i.e., the valve openings of the respective switching valves VS and VD are varied in accordance with the following formulas with a change in the trapezoidal wave signal value inputted into the respective switching valves.

The formula of valve opening change of the switching valve VS . . . (100/(CC+MO))×(IV+CC)

The formula of valve opening change of the switching valve VD . . . (L1/(100−DZ)×(−IV−DZ)

Here, the input signal is set in the form of a trapezoidal wave signal.

As shown in FIG. 12B, when the above input signal is assumed to be an input signal to a first pair of the switching valves, by inputting input signals to a plurality of pairs of switching valves such as a second pair of the switching valves or a third pair of the switching valves in such a manner that the input signals have a phase difference in terms of time, the plural sets of the switching valves can be interlocked with each other, even if a plurality of chambers are provided. In this case, the phase difference is preset.

Further, as in the above-described embodiment, the two sets of the switching valves for the two chambers may be operated in interlocking with each other by a single input signal, and this input signal may be inputted so as to have a phase difference.

Figure 13:
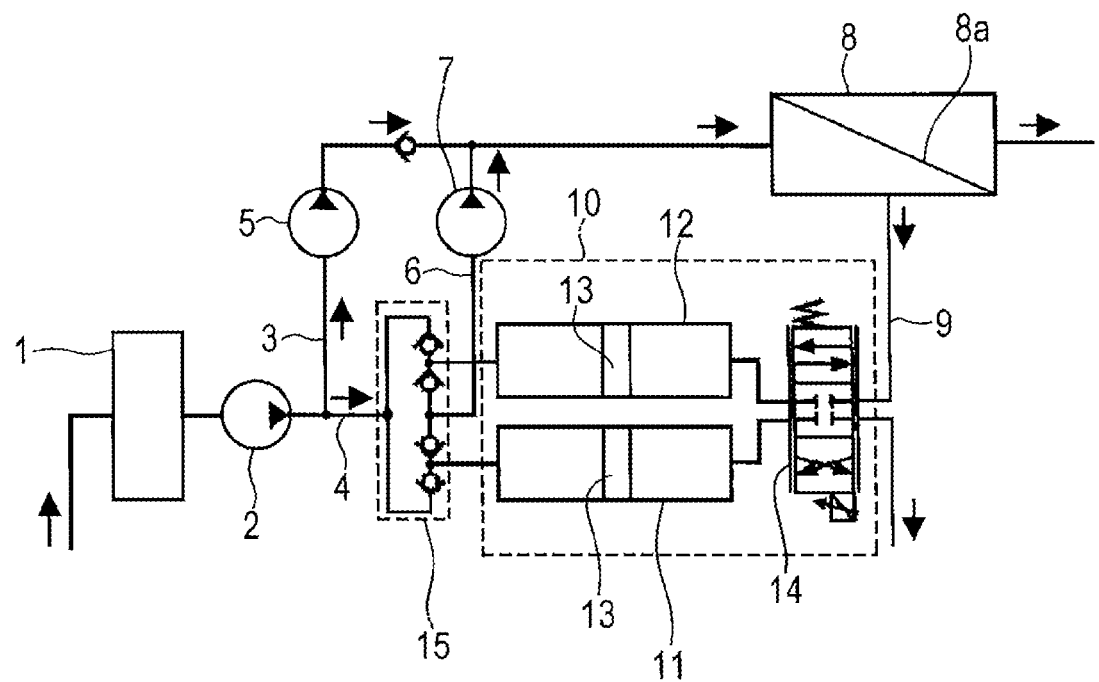
FIG. 13 is a schematic view showing a configuration example of a conventional seawater desalination system.

Although the preferred embodiments of the present invention have been described above, it should be understood that the present invention is not limited to the above embodiments, but various changes and modifications may be made to the embodiments without departing from the scope of the appended claims. For example, it should be understood that the present invention is applicable to the energy recovery chamber having a piston as shown in FIG. 13.

INDUSTRIAL APPLICABILITY

The present invention is applicable to a seawater desalination system for desalinating seawater by removing salinity from the seawater and an energy recovery apparatus which is preferably used in the seawater desalination system.

REFERENCE SIGNS LIST 1 pretreatment system
2 feed pump
3 high-pressure pump line
4 energy-recovery-apparatus seawater supply line
5 high-pressure pump
6 booster pump seawater supply line
7 booster pump
8 reverse-osmosis membrane-separation apparatus
8a reverse-osmosis membrane (RO membrane)
9 concentrated seawater line
10 energy recovery device
11, 12 energy recovery chamber
15 check valve module
16 concentrated seawater discharge line
20 switching device
21 controller
FM1, FM2, FM3, FM4 flowmeter
P1 concentrated seawater port
P2 seawater port
VS-1, VS-2, VD-1, VD-2 switching valve

The invention claimed is:

1. An energy recovery apparatus for exchanging pressure energy between concentrated seawater discharged from a reverse-osmosis membrane-separation apparatus and a part of seawater to be treated by the reverse-osmosis membrane-separation apparatus in a seawater desalination system for producing fresh water from the seawater by supplying the seawater to the reverse-osmosis membrane-separation apparatus to separate the seawater into fresh water and concentrated seawater, the energy recovery apparatus comprising:
 a plurality of chambers configured to pressurize the seawater by pressure energy of the concentrated seawater by supply and discharging the concentrated seawater and the seawater;
 a first flowmeter used for integrating a flow rate of the seawater or the concentrated seawater which flows into the chamber;
 a second flowmeter used for integrating a flow rate of the seawater or the concentrated seawater discharged from the chamber;
 at least one switching valve provided in each of the plurality of chambers and configured to switch the inflow of the concentrated seawater to the chamber and the discharge of the concentrated seawater from the chamber; and
 a controller configured to control the respective switching valves of the plurality of chambers on the basis of integrated flow rate of the chamber, the integrated flow rate of the chamber being obtained on the basis of the flow rate of the first flowmeter and/or the second flowmeter;
 wherein the controller controls the respective switching valves of the plurality of chambers by a trapezoidal waveform signal whose signal value varies from −100% to +100% with time, valve openings of the respective switching valves being determined by inputting signal values of the trapezoidal waveform signal to predetermined formulas of the relationship between signal values of the trapezoidal waveform signal and valve openings of the respective switching valves.

2. The energy recovery apparatus according to claim 1, wherein valve opening and switching time of each of the switching valves can be controlled by the trapezoidal waveform signal.

3. The energy recovery apparatus according to claim 1, wherein the valve opening of each of the respective switching valves is set so as to vary in response to the input signal based on a predetermined setting value.

4. The energy recovery apparatus according to claim 1, wherein the controller controls the switching valve so as to perform switching of the switching valve of the chamber when an integrated flow rate of the chamber by the first flowmeter or the second flowmeter reaches a predetermined value.

5. The energy recovery apparatus according to claim 4, wherein switching of the switching valve is performed by a value calculated from a predetermined ratio of the actual volume of the chamber.

6. The energy recovery apparatus according to claim 1, wherein the controller controls the flow rate of the concentrated seawater discharged from the chamber by comparing an integrated value of an inflow amount of the concentrated seawater to the chamber and an integrated value of a discharge amount of the concentrated seawater from the chamber.

7. The energy recovery apparatus according to claim 1, wherein the controller controls the switching valve so that an integrated value of the inflow amount of the seawater to the chamber is equal to or larger than an integrated value of the inflow amount of the concentrated seawater to the chamber.

8. The energy recovery apparatus according to claim 1, wherein the controller controls the respective switching valves so as to include a process for discharging the pressurized seawater from the plurality of chambers simultaneously.

9. An energy recovery apparatus for exchanging pressure energy between concentrated seawater discharged from a reverse-osmosis membrane-separation apparatus and a part of seawater to be treated by the reverse-osmosis membrane-separation apparatus in a seawater desalination system for producing fresh water from the seawater by supplying the seawater to the reverse-osmosis membrane-separation apparatus to separate the seawater into fresh water and concentrated seawater, the energy recovery apparatus comprising:
 a plurality of chambers configured to pressurize the seawater by pressure energy of the concentrated seawater by supply and discharging the concentrated seawater and the seawater;
 at least one switching valve provided in each of the plurality of chambers and configured to switch the inflow of the concentrated seawater to the chamber and the discharge of the concentrated seawater from the chamber; and
 a controller configured to control the respective switching valves of the plurality of chambers by a trapezoidal waveform signal whose signal value varies from −100% to +100% with time, valve openings of the respective switching valves being determined by inputting signal values of the trapezoidal waveform signal to predetermined formulas of the relationship between signal values of the trapezoidal waveform signal and valve openings of the respective switching valves.

10. A seawater desalination system for producing fresh water from seawater by supplying the seawater to a reverse-osmosis membrane-separation apparatus to separate the seawater into fresh water and concentrated seawater, the seawater desalination system comprising:
 an energy recovery apparatus according to claim 1 for exchanging pressure energy between the concentrated seawater discharged from the reverse-osmosis membrane-separation apparatus and a part of the seawater to be treated by the reverse-osmosis membrane-separation apparatus.

* * * * *